(12) United States Patent
Burgess et al.

(10) Patent No.: US 8,068,546 B2
(45) Date of Patent: Nov. 29, 2011

(54) METHOD AND APPARATUS FOR TRANSMITTING VIDEO SIGNALS

(75) Inventors: John Burgess, Pittstown, NJ (US); Yee Liaw, Warren, NJ (US)

(73) Assignee: RIIP, Inc., Somerset, NJ (US)

( * ) Notice: Subject to any disclaimer, the term of this patent is extended or adjusted under 35 U.S.C. 154(b) by 424 days.

(21) Appl. No.: 10/666,940

(22) Filed: Sep. 19, 2003

(65) Prior Publication Data

US 2004/0131115 A1    Jul. 8, 2004

Related U.S. Application Data

(63) Continuation-in-part of application No. 10/233,299, filed on Aug. 29, 2002, now Pat. No. 7,684,483.

(51) Int. Cl.
H04N 7/18 (2006.01)
(52) U.S. Cl. .................................. 375/240.26; 348/143
(58) Field of Classification Search ............. 375/240.01–240.29; 348/143–160; 709/200–230
See application file for complete search history.

(56) References Cited

U.S. PATENT DOCUMENTS

| | | | |
|---|---|---|---|
| 4,698,672 A | 10/1987 | Chen et al. | |
| 4,771,865 A | 9/1988 | Hinderling | |
| 5,008,747 A | 4/1991 | Carr et al. | |
| 5,483,634 A | 1/1996 | Hasegawa | |
| 5,552,832 A | 9/1996 | Astle | |
| 5,576,845 A | 11/1996 | Komatsu | |
| 5,721,842 A | 2/1998 | Beasley et al. | |
| 5,732,212 A | 3/1998 | Perholtz et al. | |
| 5,742,274 A | 4/1998 | Henry et al. | |
| 5,757,424 A | 5/1998 | Frederick | |
| 5,767,897 A | 6/1998 | Howell | |
| 5,802,213 A | 9/1998 | Gardos | |
| 5,821,986 A | 10/1998 | Yuan et al. | |
| 5,861,960 A | 1/1999 | Suzuki et al. | |
| 5,884,096 A | 3/1999 | Beasley et al. | |
| 5,937,176 A | 8/1999 | Beasley et al. | |
| 6,016,166 A | 1/2000 | Huang et al. | |
| 6,091,857 A | 7/2000 | Shaw et al. | |
| 6,112,264 A | 8/2000 | Beasley et al. | |
| 6,167,432 A | 12/2000 | Jiang | |
| 6,173,082 B1 | 1/2001 | Ishida et al. | |
| 6,252,884 B1 | 6/2001 | Hunter | |
| 6,263,365 B1 | 7/2001 | Scherpbier | |
| 6,289,378 B1 | 9/2001 | Meyer et al. | |
| 6,304,895 B1 | 10/2001 | Schneider et al. | |
| 6,330,595 B1 * | 12/2001 | Ullman et al. | ................ 709/219 |
| 6,333,750 B1 | 12/2001 | Odryna et al. | |
| 6,343,313 B1 | 1/2002 | Salesky et al. | |
| 6,345,323 B1 | 2/2002 | Beasley et al. | |

(Continued)

OTHER PUBLICATIONS

The International Search Report and Written Opinion for PCT/US04/29899 dated Aug. 31, 2006.

(Continued)

Primary Examiner — Andy Rao

(57) ABSTRACT

Disclosed is a method and apparatus for transmitting, multi-casting, or broadcasting video signals from a video source to one or more remotely located computers and/or video clients. Specifically, the disclosed method and apparatus effectively digitizes and compresses received video signals such that they may be transmitted with other digitized signals directly or via a network, such as the Internet, to a multitude of computers and/or independent video display devices. The video transmission system is also capable of receiving video signals from a non-networked computer that does not require any hardware or software modifications to be compatible with the video transmission system. The disclosed video transmission system operates independently (i.e., does not require a service provider) and is capable of recording video transmissions.

18 Claims, 11 Drawing Sheets

U.S. PATENT DOCUMENTS

| | | | |
|---|---|---|---|
| 6,363,062 | B1 | 3/2002 | Aaronson |
| 6,373,850 | B1 | 4/2002 | Lecourtier et al. |
| 6,388,658 | B1 | 5/2002 | Ahern et al. |
| 6,408,334 | B1 | 6/2002 | Bassman et al. |
| 6,445,818 | B1 | 9/2002 | Kim |
| 6,532,218 | B1 | 3/2003 | Shaffer et al. |
| 6,535,983 | B1 | 3/2003 | McCormack |
| 6,539,418 | B2 | 3/2003 | Schneider et al. |
| 6,564,380 | B1 | 5/2003 | Murphy |
| 6,567,813 | B1 | 5/2003 | Zhu et al. |
| 6,567,869 | B2 | 5/2003 | Shirley |
| 6,571,016 | B1 | 5/2003 | Mehrotra et al. |
| 6,621,413 | B1 | 9/2003 | Roman et al. |
| 6,622,018 | B1 | 9/2003 | Erekson |
| 6,664,969 | B1 | 12/2003 | Emerson |
| 6,675,174 | B1 | 1/2004 | Bolle |
| 6,681,250 | B1 | 1/2004 | Thomas et al. |
| 6,701,380 | B2 | 3/2004 | Schneider et al. |
| 6,728,753 | B1 | 4/2004 | Parasnis et al. |
| 6,771,213 | B2 | 8/2004 | Durst et al. |
| 6,772,169 | B2 | 8/2004 | Kaplan |
| 6,850,502 | B1 | 2/2005 | Kagan |
| 6,952,495 | B1 | 10/2005 | Lee |
| 7,024,474 | B2 | 4/2006 | Clubb |
| 7,042,587 | B2 | 5/2006 | Fiske |
| 7,099,934 | B1 | 8/2006 | Ewing et al. |
| 7,117,266 | B2 | 10/2006 | Fishman et al. |
| 7,127,619 | B2 * | 10/2006 | Unger et al. ............... 713/193 |
| 7,206,940 | B2 * | 4/2007 | Evans et al. ............... 713/193 |
| 7,249,167 | B1 | 7/2007 | Liaw |
| 7,260,624 | B2 | 8/2007 | Sivertsen |
| 7,342,895 | B2 | 3/2008 | Serpa |
| 7,382,397 | B2 | 6/2008 | Mottur |
| 7,502,884 | B1 | 3/2009 | Shah |
| 7,576,770 | B2 | 8/2009 | Metzger et al. |
| 2002/0018124 | A1 | 2/2002 | Mottur |
| 2002/0038334 | A1 | 3/2002 | Schneider |
| 2002/0095594 | A1 | 7/2002 | Dellmo |
| 2002/0147840 | A1 | 10/2002 | Mutton |
| 2003/0017826 | A1 | 1/2003 | Fishman |
| 2003/0030660 | A1 | 2/2003 | Dischert |
| 2003/0037130 | A1 | 2/2003 | Rollins |
| 2003/0088655 | A1 | 5/2003 | Leigh |
| 2003/0092437 | A1 | 5/2003 | Nowlin et al. |
| 2003/0112467 | A1 | 6/2003 | McCollum et al. |
| 2003/0135656 | A1 | 7/2003 | Schneider |
| 2003/0191878 | A1 | 10/2003 | Shirley |
| 2003/0217123 | A1 | 11/2003 | Anderson |
| 2004/0015980 | A1 | 1/2004 | Rowen |
| 2004/0045030 | A1 * | 3/2004 | Reynolds et al. ............. 725/110 |
| 2004/0062305 | A1 | 4/2004 | Dambrackas |
| 2004/0093401 | A1 | 5/2004 | Buswell et al. |
| 2004/0117426 | A1 * | 6/2004 | Rudkin et al. ............... 709/200 |
| 2004/0249953 | A1 | 12/2004 | Fernandez |
| 2005/0018766 | A1 | 1/2005 | Iwamura |
| 2005/0027890 | A1 | 2/2005 | Nelson |
| 2005/0030377 | A1 | 2/2005 | Li |
| 2005/0044184 | A1 | 2/2005 | Thomas |
| 2005/0094577 | A1 | 5/2005 | Ashwood-Smith |
| 2005/0104852 | A1 | 5/2005 | Emerson |
| 2005/0114894 | A1 | 5/2005 | Hoerl |
| 2005/0125519 | A1 | 6/2005 | Yang |
| 2005/0132403 | A1 | 6/2005 | Lee |
| 2005/0195775 | A1 | 9/2005 | Petite |
| 2006/0095539 | A1 | 5/2006 | Renkis |

OTHER PUBLICATIONS

The International Search Report and Written Opinion for PCT/US05/40948 dated Jul. 20, 2006.

The International Search Report and Written Opinion for PCT/US05/07684 dated Sep. 25, 2007.

The International Search Report and Written Opinion for PCT/US06/12280 dated Mar. 14, 2007.

The International Search Report and Written Opinion for PCT/US05/25275 dated May 11, 2006.

Yueh-Feng Lee, A Configurable Java Architecture for Mobile Terminal Software Download, Wireless Communications Conference, WCNC2002 IEEE, 17-21 03/02, vol. 1, abstract.

Office Action in Related U.S. Appl. No. 10/666,940, mailed on May 24, 2006.

Office Action in Related U.S. Appl. No. 10/898,001, mailed on Sep. 5, 2008.

Office Actions in Related U.S. Appl. No. 10/988,184, mailed on Sep. 14, 2007, Apr. 9, 2008, Aug. 21, 2008 and Feb. 19, 2009.

Office Action in Related U.S. Appl. No. 10/799,349, mailed on Jun. 13, 2007.

Office Action in Related U.S. Appl. No. 11/102,450, mailed on Oct. 3, 2008.

Office Action in Related U.S. Appl. No. 11/241,845, mailed on Jun. 4, 2008.

Office Actions, Examiner Interview Summary Records and notice of allowance in parent U.S. Appl. No.10/233,299.

The International Search Report and Written Opinion issued in related PCT application PCT/US06/38567, on Sep. 19, 2007.

Trial Transcript, Apex v. Raritan, Southern District of New York, Case No. 01-CV-4435, vol. 7, Jan. 2002.

Tron International, Inc., KVM Products Catalogs, 1997.

Tron International, Inc., Products Catalogs, 1996.

Tron International, Inc., Product Brochure, 1997, 4 pages.

Unisys, PW2 Advantage Series Rackmount Server, 1995.

Yee Liaw Deposition Transcript, Case No. 01-CV-4435, Mar. 3, 2005.

Yee-Shung Liaw Deposition Transcript, Case No. 01-CV-4435, Dec. 6, 2001.

Docket for case # 1:01-cv-04435-PKC, US District Court for the Southern District of New York, Oct. 23, 2003.

File History of Reissue U.S. Patent No. 5,732,212, Apr. 11, 2002. Part 1.

File History of Reissue U.S. Patent No. 5,732,212, Apr. 11, 2002. Part 2.

File History of U.S. Appl. No. 10/032,325, Jun. 14, 2004.

Findings and Conclusions, Apex v. Raritan, Civil Action No. 01-CV-0035, Feb. 25, 2002.

Investor's Business Daily, Box Keeps Monitors, Mice to a Minimum, Sep. 8, 1997.

Joseph C. McAlexander Deposition Transcript, Case No. 01-CV-4435, Apr. 27, 2005.

KVM Switch History, Aug. 2, 2002, 2 pages.

KVM Switches Roundup, Windows NT Magazine, Jul. 1997.

Lan Times, The beauty of Apex is a two-sided story, Nov. 20, 1995.

Lightwave Communications, Inc., Product Brochure, APX 304594-304605, Jun. 1, 1998.

Lu, E&J Int. 4-Port KVM Switch, Jul. 4, 2001.

Marksman Transcript, Avocent v. Raritan, Civil Action No. 4435, Feb. 3, 2005.

Marksman Transcript, Avocent v. Raritan, Civil Action No. 4435, Feb. 4, 2005.

Memorandum and Order on Marksman issues, Case No. 01-CV-4435, (Mar. 11, 2005).

Network Computing, Product Brochure, May 15, 1995, 5 pages.

Network Technologies Inc., Product Brochure, 1998, 2 pages.

Network World, advisement, Jul. 6,1992.

Ocean Isle, Reachout Product Brochure, RCI 172996-173006, Jun. 1994.

PC World, New Products, May 1995, 2 pages.

PolyCon GmbH Data System Inc., product catalogs, APX 024328-042697, prior to Spring, 1995.

Press Release, Maintain Error-Free Central Control of 128 PCs from One Set of Keyboard, Mouse, and Monitor, Feb. 4, 1999, 1 page.

Protest Under 37 CFR 1.291 Filed in U.S. Appl. No. 08/969,723, Feb. 13, 1999.

Raritan, CompuSwitch, Mar. 16, 1998, 1 page.

Raritan, Dominion KSX, Jul. 19, 2003, RCI 139356-139371.

Raritan, Dominion KX and Dominion KSX, 2004, 181193-181211.

Raritan, MasterConsole MXU2, Jul. 31, 2001.

Raritan, MasterConsole II, User's Manual, 2000.

Raritan, Paragon UMT2161, RCI 147483-147505, Jul. 5, 2002.

Raritan, Paragon User's Guide, Jun. 15, 2000.

Raritan, Paragon II User Manual, 2004.

Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Adder, Products Brochure, APX 304572-304579, Apr. 1, 1998, 8 pages.
AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-082971, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex et al, Products Brochure, APX 316564-316621.
Apex et al, Products Brochure, APX 316848-316909.
Apex et al, Products Brochure, APX 316910-316969.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView PRO User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.

Ching-I Hsu Deposition Transcript, Case No. 01-CV-4435, Mar. 11, 2005.
Cybex, Director Installer/User Guide, Nov., 1996.
Cybex, 4 × P & 1 × P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 18, 2005).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer Inc.'s Response to Plaintiffs First Set of Post Remand Interrogatory Requirements to Raritan (No. 1R-16R). (Dec. 16, 2004).
Defendant Raritan Computer, Inc.'s Response to Plaintiffs Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiffs First Set of Interrogatories (Nos. 9-12), Aug. 31, 2001.
Defendant Raritan Computer, Inc.'s Supplemental Response to Plaintiffs Second Set of Interrogatories (Nos. 9-12), Dec. 12, 2001.
Dei, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002.
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
The extended European Search Report mailed on Oct. 27, 2010 in the related European Application No. 05820759.8.
The Office Action issued in the related U.S. Appl. No. 10/898,001 on Jun. 3, 2009.
The Office Actions issued in the related U.S. Appl. No. 10/988,184 on Jun. 27, 2008, Sep. 23, 2009 and Jun. 14, 2010.
The Office Actions issued in the related U.S. Appl. No. 10/233,299 on Aug. 4, 2005, Jan. 11, 2006, Jul. 24, 2006 and Jan. 4, 2007.
The Office Actions issued in the related U.S. Appl. No. 10/233,299 on Jan. 31, 2007, May 21, 2007, Jul. 13, 2007 and Jul. 19, 2007.
The Office Actions issued in the related U.S. Appl. No. 10/233,299 on Jul. 24, 2007, Oct. 29, 2007 and Dec. 3, 2007.
The Office Actions issued in the related U.S. Appl. No. 10/233,299 on Feb. 13, 2008, May 23, 2008, Jan. 23, 2009 and Oct. 21, 2009.
The Office Actions issued in the related U.S. Appl. No. 10/799,349 on Sep. 8, 2008, Feb. 3, 2010 and Aug. 19, 2010.
The Office Actions issued in the related U.S. Appl. No. 11/102,450 on Dec. 18, 2009 and Aug. 9, 2010.
The Office Actions issued in the related U.S. Appl. No. 11/241,845 on Jan. 21, 2009, Jul. 31, 2009, Mar. 24, 2010 and Nov. 1, 2010.
Artimi Ltd., "UWB & Mesh Networks White Paper," Aug. 2003.

\* cited by examiner

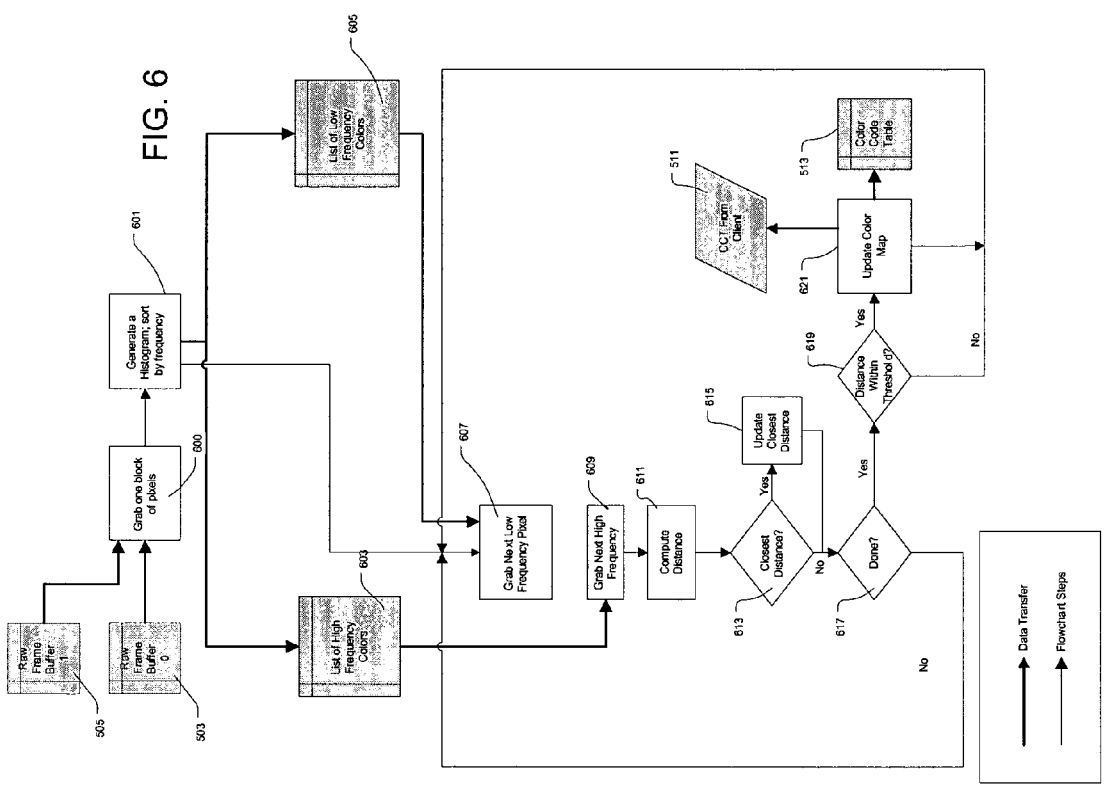

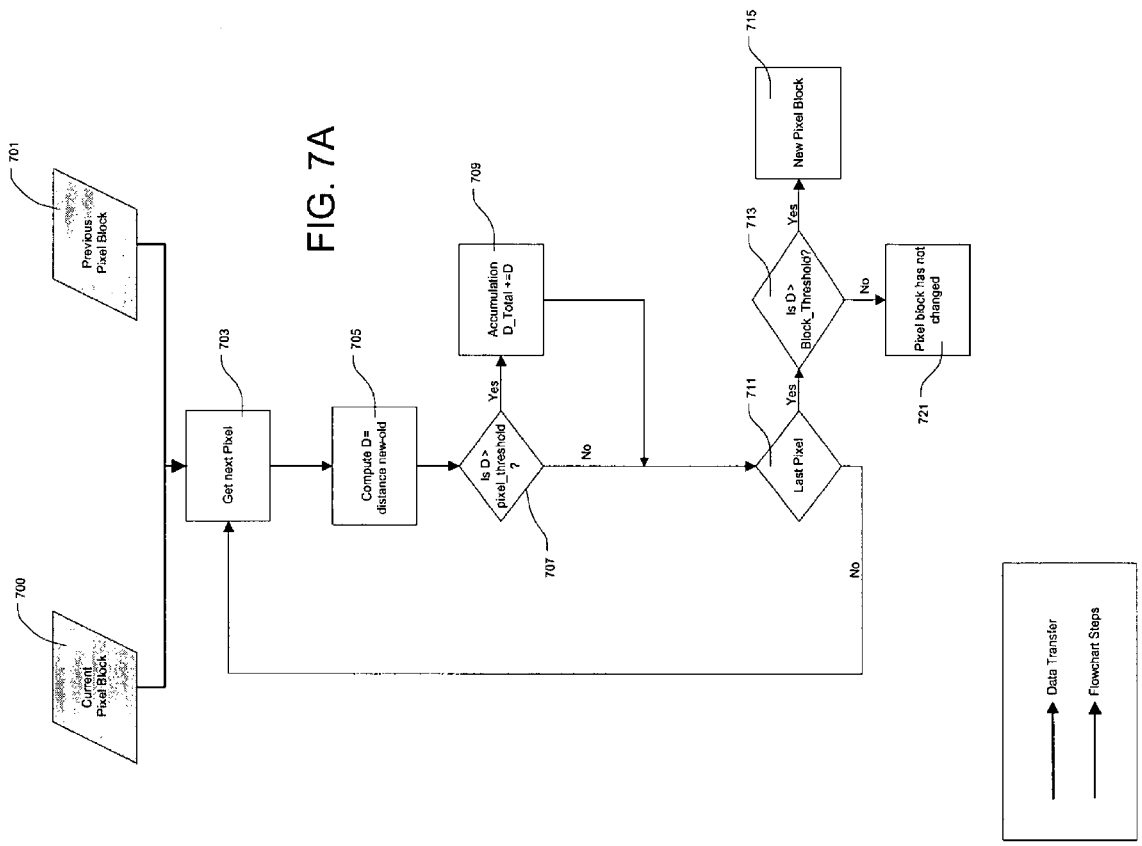

METHOD AND APPARATUS FOR TRANSMITTING VIDEO SIGNALS

CROSS REFERENCE TO RELATED APPLICATIONS

This application is a continuation-in-part of application Ser. No. 10/233,299, filed Aug. 29, 2002 now U.S. Pat. No. 7,684,483.

TECHNICAL FIELD OF THE INVENTION

The present invention is directed generally to the field of transmitting video signals. Specifically, the present invention relates to a method and apparatus for effectively multicasting video signals by digitizing and compressing received video signals such that they may be transmitted with other digitized signals directly or via a network, such as the Internet, to a multitude of computers and/or independent video display devices, whereupon the video signals are decompressed and displayed.

BACKGROUND OF THE INVENTION

A few types of video transmission systems are commonly used today including multicast, broadcast, and point-to-point video transmission systems. Multicast and broadcast systems both transmit video signals from one source to multiple recipients simultaneously. However, broadcast systems transmit to everyone, whereas multicast systems transmit only to a specific group. In contrast, a point-to-point video transmission system transmits video from one source to one recipient at any given time. A point-to-point video transmission system may have multiple video signal recipients, but this type of system requires multiple video signal transmissions (i.e., one for each recipient).

Video transmission systems are widely used for many purposes. One such purpose is to allow individuals at one or more remote sites to visually and/or audibly participate in a local presentation without physical relocation. In this scenario, the video transmission system typically includes a video source, such as a video camera or computer, at the location at which the live presentation occurs. Also, each participant location is equipped with a video display unit for viewing the presentation. The video signals may then be transmitted from the local presentation site to each participant location using any one of a variety of communication mediums.

One such communication medium is a dedicated line, such as a telephone or cable line. These lines may be provided in a variety of forms including a twisted pair telephone line, a Digital Subscriber Line ("DSL"), an Integrated Services Digital Network ("ISDN") line, a T1 line, a cable line, etc.

When implementing a video transmission that operates with a dedicated line, the user incurs many costs. First, the system user typically pays an ongoing fee for continued use of the dedicated line. Second, the system user must purchase video transmission system equipment that is compatible with the chosen type of dedicated line. Third, the system user must pay for installation, wiring, and setup of the custom equipment. In addition to the relatively high cost of such systems, the scalability of these systems is limited to those locations to which the dedicated line is connected. In many instances, this may include only two or three locations. For major corporations having hundreds of worldwide offices, employees at non-connected locations will still need to travel to a connected location. Alternatively, dedicated telephone lines may be purchased such that every location is connected to the dedicated line, however, this typically results in tremendous installation and maintenance costs. Consequently, choosing a dedicated line as the communication medium for implementation of a video transmission system having many participant locations is typically cost prohibitive. Also, such systems are typically not compatible with an independent video source that has not been modified or designed for compatibility with the custom equipment.

An alternative communication medium is an existing computer network such as a Local Area Network ("LAN") or Wide Area Network ("WAN"). Such systems are typically server-based. That is, the same server that controls the flow of all network information also controls the flow of the multicast video signals. Such systems are traditionally more economical than dedicated line systems, as they do not require a dedicated infrastructure. Rather, such systems utilize existing computer network infrastructures, thereby minimizing wiring costs. However, since these systems are server-based, they typically only allow participants to receive multicast video signals via a computer connected to the computer network. In other words, each participant location must be equipped with a video monitor and a networked computer. Furthermore, the video source, such as the computer used to provide the presentation, must also be connected to the network to allow the server to receive the video signals. Additionally, some networked systems require the video source to execute application specific software to allow its video signals to be transmitted via the network. Therefore, although this type of video transmission system may be more economical, it is not compatible with independent, non-networked video sources.

Yet another alternative communication medium is the Internet. Such systems typically require the system user to purchase a subscription from a service provider. This subscription allows the system user to utilize the service provider's server-based infrastructure to manage communications from the system user's computer or video camera to the intended recipients via the Internet. The service provider's infrastructure receives the video signals generated by the system user via the Internet, whereupon the signals are processed and transmitted in a point-to-point manner to each of the designated recipients also via the Internet. Such service providers typically couple the video transmission with a telephone conference call to allow interactive visual and audible presentations. For example, a system user typically schedules a presentation with a service provider to occur at a specific date and time. Thereafter, this information is sent to all intended participants along with password data and information regarding how to connect to the presentation. At the scheduled time, the participants connect to the presentation visually through their computer by logging on to the service provider's web page and entering the required password and/or session information. Similarly, the participants connect to the presentation audibly by dialing a designated telephone number and entering the required password and session data. Such a service typically requires continual payment of a subscription fee and purchase of equipment setup prior to system use. Also, these systems are typically server-based and the service is limited to those features offered by the service provider. Furthermore, these service providers do not offer recording of presentations for later review and/or playback.

Many of the aforementioned communication mediums are digital mediums. When a digital medium is utilized to transmit analog video signals, these analog signals must be converted to a digital format prior to transmission via the digital medium. These digital signals, in uncompressed form, require a communication medium having a large bandwidth (i.e., transmission capacity) if these signals are to be transmitted in near real-time. Generally, even high-speed connections such as cable and DSL are incapable of accommodating such bandwidth requirements. Furthermore, a majority of home users still connect to the Internet via a traditional twisted pair telephone line having even less bandwidth than their high-speed alternatives. Therefore, if a video transmission system is to be compatible with any type of communication medium, the converted digital video signals must be compressed prior to transmission and decompressed after transmission.

The video transmission system of the present invention uses the compression algorithm disclosed in co-pending application Ser. No. 10/233,299, which is incorporated herein by reference, to reduce and compress the digital data that must be transmitted to the remote computers and/or video display devices. Generally, video signals generated by a personal computer have large amounts of both spatial and interframe redundancies. For example, in a near idle personal computer, the only change between successive frames of video might be the blinking of a cursor. Even as a user types a document, a majority of the screen does not change over a period of time. Hence, the compression algorithm used by the present invention takes advantage of these redundancies, both between successive frames of video and within each individual frame, to reduce the amount of digital video signal data that is transmitted to the remote computers and/or video display devices. Reducing the amount of digital data transmitted over the communication medium decreases communication time and decreases the required bandwidth.

Most forms of video compression known in the art require complicated calculations. For example, Moving Pictures Experts Group ("MPEG") video compression algorithms use the discrete cosine transform as part of its algorithm. Also, the MPEG standard relies on the recognition of "motion" between frames, which requires calculation of motion vectors that describe how portions of the video image have changed over a period of time. Since these algorithms are calculation intensive, they either require relatively expensive hardware that performs such calculations quickly or extended transmission times that allow sufficient time for slower hardware to complete the calculations.

In addition to complexity, many existing video compression techniques are lossy (i.e., they do not transmit all of the video signal information in order to reduce the required bandwidth). Typically, such lossy techniques either reduce the detail of a video image or reduce the number of colors. Although reducing the number of colors could be part of an adequate compression solution for some video transmission system applications, in many other applications, such a result defeats the intended purposes of the video transmission system.

Several patents are directed to the field of video transmission systems. For example, Zhu et al. U.S. Pat. No. 6,567,813 ("Zhu"), assigned on its face to WebEx Communications, Inc., discloses a distributed, collaborative computer system that includes a plurality of server computers connected via a high speed link. The Zhu system allows client computers to connect to any available server computer to start or join a conference hosted on either the server computer to which the client computer is connected or to any other server in the system. This system is server-based, where the server is networked to other servers and clients.

In contrast, Lecourtier et al. U.S. Pat. No. 6,373,850 ("Lecourtier"), assigned on its face to Bull S. A., discloses a videoconferencing system that utilizes a standalone routing switch. The Lecourtier system incorporates at least one group switching center that transmits data directly, in a point-to-point manner, to each data terminal that sends or receives the video and data transmission. According to Lecourtier, this method eliminates collisions between data terminals and thereby allows large quantities of video and audio data to be transmitted over long distances.

Howell U.S. Pat. No. 5,767,897 ("Howell"), assigned on its face to PictureTel Corporation, discloses a video conferencing system that utilizes a director controller situated at the site of the presentation (e.g., on a lecture podium). The director controller includes a video display and a control section. The video display allows the podium speaker to view the transmitted video signals, whereas the control section allows the podium speaker to selectively control the distribution of generated audio and video information signals among local and remote sites. The Howell system incorporates networked controllers having a video camera, microphone, and speaker that captures the podium speaker's presentation and transmits the captured audio and video to remote, networked locations also having a video camera, microphone, speaker, and video display unit.

Yuan et al. U.S. Pat. No. 5,821,986 ("Yuan"), assigned on its face to PictureTel Corporation, discloses a scalable video conferencing system for use between personal computers connected via a network. The Yuan system encodes an image sequence for transmission via the network. The type of encoding disclosed in Yuan enables the image sequence to be decoded at any one of at least two spatial resolutions and at any one of the available frame rates. Such encoding allows video transmission via a network environment in which there is no guaranteed bandwidth or connection quality, such as via standard twisted pair telephone lines.

Salesky et al. U.S. Pat. No. 6,343,313 ("Salesky"), assigned on its face to Pixion, Inc., discloses a computer conferencing system with real-time, multipoint, multi-speed, multi-stream scalability. The Salesky system is a server-based system that allows conference participants to share all or a portion of the video displayed on the participant's computer screen. Furthermore, this system allows conference participants to be located at sites that are remote from each other, and requires all equipment, including the presenter's equipment, to be connected to the same network.

Scherpbier U.S. Pat. No. 6,263,365 ("Scherpbier"), assigned on its face to Raindance Communications, Inc., discloses a browser controller that allows a pilot computer to display selected web pages to both the pilot computer and one or more passenger computers (e.g., to demonstrate and/or discuss selected web page content during a conference call). Initially, the user of the passenger computer is directed to log on to a control web site, which downloads an active control, such as an applet, to the passenger computer. When the pilot computer chooses to display a particular web site to the passenger computers, it sends the web site's URL to the control site, which retrieves and sanitizes (i.e., disables the hyperlinks) the web page. Thereafter, the control site causes the passenger computers' active control to download the sanitized web page. However, the web site viewed by the pilot computer contains active hyperlinks, which the pilot computer user may click to activate. The control site senses these hyperlink selections and causes the pilot computer and passenger computers to be connected to the chosen, hyperlink web site.

Jiang U.S. Pat. No. 6,167,432 ("Jiang"), assigned on its face to WebEx Communications, Inc., discloses a method for creating peer-to-peer connections over a network to facilitate conferencing among network users. The Jiang system allows a designated location (e.g., a web site) on an interconnected network (e.g., the Internet) to be set up such that a conference may be created, and conference participants may be easily joined. The Jiang system maintains the Internet Protocol ("IP") addresses of the conference participants at the designated location. These addresses are transmitted to new conference participants without requiring that the new conference participants, or their equipment, have prior knowledge of the IP addresses. Once the new participant is joined in the conference, the data packets containing the conference data do not pass through the designated location or a central host, but rather are sent and received directly by the application program of each participant.

Thus, in light of the prior art discussed herein, there is a clear need for a standalone, multicast capable, video transmission system that operates without the need for a service provider and does not rely on a network server or the Internet to control transmission of the video signals. Such a system should provide near real time transmission of compressed video. The video compression must be efficient enough to transmit video in near real-time over standard twisted pair telephone line bandwidths, yet it must not be too lossy (i.e., the transmitted video images must not be noticeably degraded). Further, the video transmission system should be compatible with multiple platforms (e.g. Macintosh, IBM, UNIX, etc.) and should not require any modifications, including connection to a network, to the computer or other video device used for the presentation. Also, the system should not require a client computer at the participants' locations. Finally, the system should have the ability to control all video and data transmissions.

SUMMARY OF THE INVENTION

The present invention provides an improved video transmission system that digitizes and compresses video signals and transmits these signals with other digitized signals to one or more remote locations. The present invention is directed to multicasting video signals generated at an initiating computer along with other digitized signals generated either by or independent of the initiating computer to multiple recipients. These signals may be sent via a direct connection, LAN, WAN, Internet, or any other communication medium.

One application of the present invention, and the application that will be referred to herein to describe the present invention in greater detail, is multicasting a presentation performed on a local, initiating computer to multiple remote recipients via remote display devices. The transmitted video signals may include the signals displayed on the initiating computer's screen (e.g., a PowerPoint® presentation), video images received by a video device connected to the initiating computer (e.g., a video camera), or both. In this application, the same communication medium that transmits the video signals also transmits other data signals including IP address signals, session key signals, keyboard signals, and optionally applet signals. These signals are used by the video transmission system of the present invention to authenticate and authorize presentation participants. Presentations may be transmitted for a variety of purposes, including educational purposes such as distributing a lecture occurring at an educational institution, to one or more remote locations.

Although the invention will be discussed herein with respect to the aforementioned application, the present invention may be used in any application in which video signals and/or data signals are multicast to multiple recipients. For example, the present invention may be used for military applications. Drone airplanes currently transmit telemetry data and streaming video received from a video camera to a server on the ground. Thereafter, the server multicasts the streaming video, but not the telemetry data. By utilizing the present invention, both streaming video and telemetry data may be multicast simultaneously to all recipients.

It should also be noted that although the present invention is discussed herein with respect to multicasting video and other signals, the present invention may also be used to broadcast these signals or transmit these signals in a point-to-point manner. Broadcasting, as compared to multicasting, simply requires the present invention to allow all recipients, not just those that are authorized and authenticated, to receive the broadcast signals. Point-to-point transmission, as compared to multicasting, simply requires that the video signals be sent to each recipient individually, in lieu of sending the video signals to multiple recipients simultaneously. Therefore, although the term multicast is used herein for simplicity, it should be understood that the present invention, as described herein, may be used to broadcast signals, perform point-to-point transmission of signals, and transmit signals using any other non-multicast methods.

Minimally, the present invention may be implemented with an initiating computer (i.e., a laptop or other computer operated by the person performing the presentation), one video server, a network (e.g., the Internet, LAN, WAN, etc.), and one networked computer. In this minimal configuration, the video out port (e.g., VGA port, SVGA port, etc.) of the initiating computer, which may be any standard, unmodified computer, is connected to the video in port of the video server of the present invention via a standard video cable. The video server is connected to the network using a standard network cable (e.g., a CAT 5 cable) connected from the video server network port to a port on the network, typically a port of a network hub or router. The networked computer does not require any hardware modifications as it is already connected to the network.

In this minimal embodiment, the video server receives video signals from the initiating computer and multicasts them to the network via the network cable. When the networked computer attempts to receive the multicast video signals from the network, if the computer does not have the client software of the present invention, the video server will automatically download this software to the networked computer via the network. After the software is installed, the video server will attempt to authenticate and authorize this networked computer to receive the video signals. If the attempt is successful, the networked computer uses the downloaded client software to receive and display the video signals multicast by the video server via the network.

This minimal embodiment may be expanded to allow the video transmission system user to display the presentation on a video display device local to the initiating computer. In this embodiment, a custom Y-style video cable is used in lieu of the standard video cable to connect both the initiating computer and a local display device to the video server. In this application, the presentation video signals are provided to the local video display device directly from the initiating computer—not the video server. However, the video server does provide the same video signals to all remote video display devices. This application requires a keyboard and/or mouse to be connected to the video server to allow local presentation participants to enter the data required for authentication and authorization by the video server. The users enter this data in response to prompts displayed on the local video display device. The prompt data video signals are generated by the video server of the present invention and transmitted via the custom Y cable from the video server to the local video display. That is, the custom Y cable transmits either the presentation video signals from the initiating computer to the local video display device or the prompt data video signals from the video server to the local video display device. The ability of the video server of the present invention to directly accept a keyboard and a mouse allows the presentation to be displayed locally without the need for a computer, such as a networked computer, at the local presentation site.

Similarly, a video client of the present invention may be employed at remote presentation sites to work in conjunction with the video server, thereby eliminating the need for a computer at the remote site. Similar to the video server, a video display device, keyboard, mouse, and system cable may be directly connected to the video client. As discussed above for the video server, direct connection of a keyboard and mouse to the video client allows the remote presentation participant to enter authentication and authorization information in response to prompts displayed on the remote video display device. These keyboard or mouse signals are received at the video client and transmitted to the video server, wherein an embedded web server, or other similar device, makes all authentication and authorization decisions.

In the preferred embodiment of the present invention, the video client's system cable is a CAT 5 cable, although any type of cable may be used in any one of at least three configurations. In a first configuration, the system cable may connect the video client to a network, such as the Internet or a LAN/WAN, and the network communicates the multicast video signals from the video server to the video client and its attached video display device. This first configuration reduces wiring cost substantially by taking advantage of existing network wiring. However, failure of a network hub (i.e., a central connecting device in a network that joins communications lines) may prevent the presentation from reaching one or more remote participant locations. Alternatively, in a second configuration, the system cable may connect the video server directly to the video client. In contrast to the first configuration, this second configuration eliminates any dependence of the system on the network equipment. That is, if the network fails, the multicast video signals will still reach the remote video display device. However, this second configuration increases the cost associated with wiring the video server to one or more remote participant locations. In a third, hybrid configuration, some of the remote participant locations utilize direct system cables and others utilize networked system cables. The configuration of each remote participant location may be chosen based upon the distance from the video server and the criticality of failure. For example, a second or third conference room may be wired to the video server via a direct cable to ensure reliability in a location having a plurality of participants. In contrast, a location having one participant may be wired to the video server via a network cable and, if a failure occurs, the individual may relocate to a main conference room, wherein the video display device has a direct connection to the video transmission system.

Remote participant locations may also be connected in a hybrid configuration. That is, remote locations may include networked computers operating client software automatically downloaded to it from the video server, video clients attached with a networked or direct system cable, or any combination of the two.

Additionally, the present invention allows video signals to be received from an initiating computer operating any one of a variety of operating systems. Also, the remote display devices and/or networked computers may operate with any one of a variety of operating systems or protocols, including those that differ from the initiating computer and/or other remote networked computers. These operating systems and protocols may include, but are not limited to, those manufactured by Microsoft Corporation ("Microsoft") (Windows), Apple Computer, Inc. ("Apple") (Macintosh), Sun Microsystems, Inc. ("Sun") (Unix), Digital Equipment Corporation ("DEC"), Compaq Computer Corporation ("Compaq") (Alpha), IBM (RS/6000), Hewlett-Packard Company ("HP") (HP9000), SGI (formerly "Silicon Graphics, Inc."), etc. Additionally, local devices may communicate with remote computers via a variety of protocols including, but not limited to, USB, American Standard Code for Information Interchange ("ASCII"), Recommend Standard-232 ("RS-232"), etc.

The video server digitizes and compresses the video signals received from the initiating computer prior to transmission to the remote computers and/or remote video display devices using the analog-to-digital conversion circuit and compression algorithm disclosed in co-pending application Ser. No. 10/233,299. The analog-to-digital conversion circuit converts the received analog video signals into a frame of digital pixel values using an analog-to-digital ("A/D") converter. This circuit captures video output from the initiating computer at a speed of at least 20 frames/second and converts the captured analog video signals to a digital representation of pixels. Each pixel is digitally represented with 5 bits for red, 5 bits for green, and 5 bits for blue. The digital representation is then stored in a raw frame buffer. The compression algorithm then processes the digital data contained in the raw frame buffer. The compression algorithm is actually a combination of four sub-algorithms (i.e., the Noise Reduction and Difference Test ("NRDT"), Smoothing, Caching, and Bit Splicing/Compression sub-algorithms) as described in greater detail below.

After the video signals have been processed by the video server and are transmitted to the remote participant location, decompression occurs. That is, at the point that decompression of the video signals is performed, the video server has received the video signals from the initiating computer, converted them from analog to digital, compressed them (including reduction of noise), and transmitted them from the video server to the remote participant's location. At the remote participant location, either a video client or a networked computer receives the video signals, decompresses them, constructs the video image using the decompressed data and data contained in its video cache, and transmits the constructed video image to the remote participants' video display device. The same decompression algorithm may be modified to also receive transmitted data or control signals, such as authentication and authorization signals produced by a keyboard or mouse attached to the video server. Such signals are required initially to allow the remote participant location to be authorized to participate in the presentation. Alternatively, these data or control signals may be processed by hardware or software that operates independent of the decompression algorithm.

The remote equipment (i.e., video client, remote networked computer, standalone computer, etc.) operates as a decompression device by executing a decompression algorithm. Along with any transmitted video or data signals, the video server transmits messages to the decompression devices regarding the portions of the video that yielded cache hits. In response, the decompression device constructs the video frame based upon the transmitted video signals and the blocks of pixels contained in its local cache. Also, the decompression device updates its local cache with the new blocks of pixels received from the video server. In this manner, the decompression device caches remain synchronized with the compression device cache. Both the compression device and the decompression device update their respective cache by replacing older video data with newer video data.

Furthermore, the video signals transmitted by the video server have been compressed using a lossless compression algorithm as discussed above. Therefore, the decompression device must reverse this lossless compression. This is done by identifying the changed portions of the video image, based upon flags transmitted by the video server. From this flag information, the decompression device is able to reconstruct full frames of video.

In addition, the decompression device converts the video frame to its original color scheme by reversing the CCT conversion. Therefore, the decompression device, like the video server, locally stores a copy of the same CCT used to compress the video data. The CCT is then used to convert the video data received from the video server to a standard RGB format that may be displayed on the remote video display device.

The decompression algorithm can be implemented in the video transmission system of the present invention in a variety of embodiments. For example, in one embodiment, it can be implemented as a software application that is executed by a remote networked or standalone computer. In this embodiment, the video server may be configured to automatically download software containing the decompression algorithm to the remote computer during their initial communication.

In an alternate embodiment, the decompression algorithm can be implemented to execute within a web browser such as Internet Explorer or Netscape® Navigator®. Such an embodiment would eliminate the need for installation of application specific software on the remote computer. Also, this embodiment allows the video server to easily transmit the presentation video signals to any computer with Internet capabilities, regardless of the distance at which the computer is located from the initiating computer. This feature reduces the cabling cost associated with the video transmission system of the present invention.

Finally, in yet another embodiment, the decompression algorithm can be implemented in a device composed of a microprocessor and memory, such as the video client of the present invention. Such an embodiment completely eliminates the need for a computer at the remote presentation location.

Since the present invention can be used to display presentation video signals, or other types of video signals, at locations that may be at a great distance from the initiating computer, it is important to ensure that the video signal transmission is secure. If the transmission is not secure, hackers, competitors, or other unauthorized users could potentially view the confidential presentation. Therefore, the video transmission system of the present invention is designed to easily integrate with digital encryption techniques known in the art. In one embodiment of the present invention, a 128-bit encryption technique is used both to verify the identity of the remote participant and to encrypt and decrypt the transmitted video and data signals. In this embodiment, a 128-bit public key RSA encryption technique is used to verify the remote participant, and a 128-bit RC4 private key encryption is used to encrypt and decrypt the transmitted signals. Of course, other encryption techniques or security measures may be used.

Finally, since the video transmission system of the present invention allows for platform independent communications, the compression algorithm utilized by the preferred embodiment of the present invention does not use operating system specific hooks, nor does it employ platform specific GDI calls.

In the preferred embodiment of the present invention, the compression algorithm described herein and in co-pending application Ser. No. 10/233,299 is used to transmit the video signals. However, the video transmission system of the present invention is not limited to such an embodiment. Rather, this system may be employed with any compression algorithm without departing from the spirit of the present invention.

Therefore, it is an object of the invention to provide a video multicast system for securely broadcasting video and/or audio to remote participant equipment via a communications network (e.g, the Internet, a local area network, a wide area network, etc.)

It is also an object of the present invention to provide a video multicast system that is expandable to accommodate any number of participants.

It is another object of the invention to provide a video multicast system capable of transmitting a video signal without any video signal degradation.

It is another object of the invention to provide a video multicast system which provides a secure and reliable connection for all participants.

It is yet another object of the invention to provide a video multicast system which is completely isolated from any external networks.

It is still another an object of the invention to provide a video multicast system in which the broadcast video signal may be viewed utilizing software or a web browser.

It is yet another object of the invention to provide a video multicast system for multicasting a video display to conference rooms and/or individual computers located at a corporation and over the Internet.

It is another object of the invention to provide a video multicast system capable of multicasting a video signal as well as telemetry data related to the video signal.

It is still another object of the invention to provide a video multicast system for use in an educational environment.

It is still another object of the invention to provide a video multicast system which allows video conferencing without any setup or service provider.

It is another object of the invention to provide a vide multicast system capable of displaying high quality video at one or more locations remote from a presenter.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to the preferred embodiment as well as some alternate embodiments set forth in the illustrations of the accompanying drawings. Although the illustrated embodiments are merely exemplary of systems for carrying out the present invention, the organization, expanded configurations and method of operation of the invention, in general, together with further objectives and advantages thereof, may be more easily understood by reference to the drawings and the following description. The drawings are not intended to limit the scope of the invention, which is set forth with particularity in the claims as appended or as subsequently amended, but merely to clarify and exemplify the invention.

For a more complete understanding of the present invention, reference is now made to the following drawings in which:

FIG. 6 depicts a detailed flowchart of the nearest color match function of FIG. 5A and its integration with the CCT of the compression algorithm.

FIG. 7A depicts a detailed flowchart of the RGB NRDT sub-algorithm of FIG. 5A.

DETAILED DESCRIPTION OF THE PREFERRED EMBODIMENTS

As required, a detailed illustrative embodiment of the present invention is disclosed herein. However, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1:
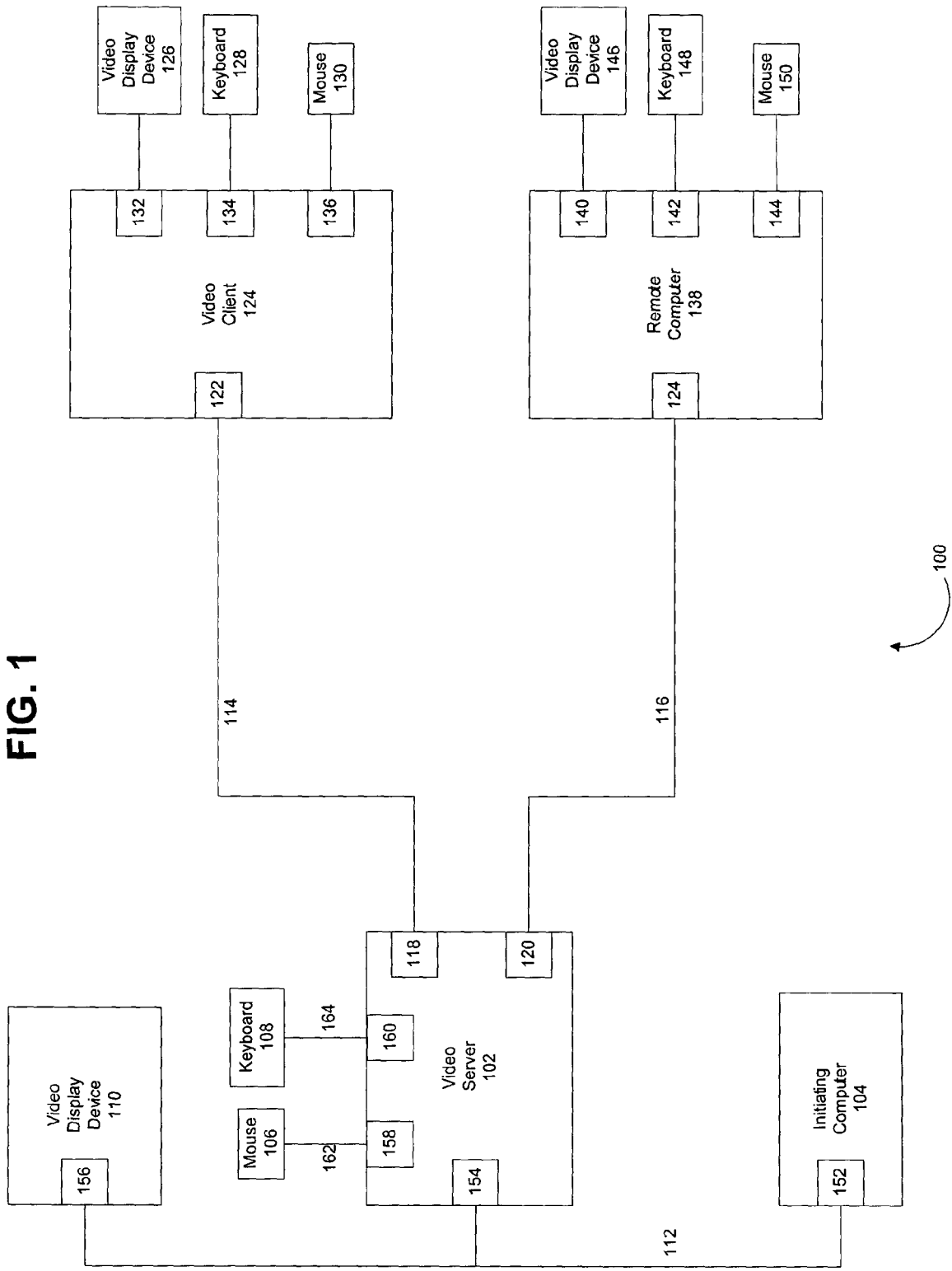
FIG. 1 depicts a block diagram of the hardware configuration of the preferred embodiment of the multicast system according to the present invention in which the video transmission system is utilized to multicast presentation video signals from an initiating computer to multiple remote participant locations.

Referring first to FIG. 1, depicted is a block diagram of the hardware configuration of the video multicast system according to the preferred embodiment of the present invention. The term "local" will be used herein to describe the area proximal to video server 102, and the term "remote" will be used herein to describe participant locations that are connected to video server 102 via a connection other than communication path 112 or its equivalent.

As illustrated in FIG. 1, the video signals generated by initiating computer 104 are transmitted from standard video out port 152 via communication path 112 to video in port 154 of video server 102 and video in port 156 of video display device 110. Video out port 152 and video in port 156 are standard video ports that come pre-packaged with initiating computer 104 and video display device 156, respectively. In the preferred embodiment, communication path 112 includes two VGA connectors for connection to these ports. However, communication path 112 may be alternatively configured to include ports other than VGA including, but not limited to, SuperVGA ("SVGA"), S-video, composite video, etc.

Preferably, video server 112 also contains mouse port 158 and keyboard port 160, which connect mouse 106 and keyboard 108, respectively, to video server 112. Also, in the preferred embodiment, mouse 106 and keyboard 108 are connected via separate communication paths 162 and 164, respectively, and many types of such paths (e.g., cables, wireless, etc.) are well known in the art. However, any method of connecting mouse 106 and keyboard 108 to video server 102 may be used with the present invention. For example, one alternative configuration connects mouse 106 and keyboard 108 to video server 102 via a shared USB connection. In this configuration, mouse port 158 and keyboard port 160 are actually one combined USB port. In another configuration, mouse 106 and keyboard 108 connect to video server 102 via a wireless connection. Alternatively, depending on the desired application of the present invention, either or both of mouse 106 and keyboard 108 may not be required for system operation. Mouse 106 and/or keyboard 108 are utilized to allow the local presentation participants to provide input to video server 102. This feature allows the presentation to be interactive. For example, participants may provide feedback regarding the speed of the presentation (i.e., too fast or too slow), readiness, questions, etc.

In an alternative embodiment, the system user may not need or intend to display the presentation locally. In such an embodiment, communication path 112 may be configured to connect initiating computer 104 to video server 102 only. Here, video display device 110, mouse 106, and keyboard 108 are not required.

Video server 102 includes communication devices 118 and 120, and video client 124 and remote computer 138 include communication devices 122 and 124, respectively. Each of these communication devices is capable of bi-directional, digital communication via its attached communication path 114 or 116. Communication devices 118, 120, 122, and 124 may be modems, network interface cards, wireless network cards, RS-232 transceivers, RS-485 transceivers, or any similar devices capable of providing bi-directional digital communication signals. Similarly, communication paths 114 and 116 may be standard telephone lines, the Internet, wireless connections, a LAN, a WAN, cables, or any other medium capable of transmitting bi-directional digital communication signals. Communication devices 118 and 120 enable video server 102 to communicate with video client 124 and remote computer 138, respectively, via any standard agreed upon protocol. Examples of these protocols include, but are not limited to, Transmission Control Protocol/Internet Protocol ("TCP/IP"), Ethernet, User Datagram Protocol ("UDP"), etc.

Communication device 122 of video client 124 receives the digitized and compressed video signals transmitted via communication path 114 from video server 102. Thereafter, the transmitted video signals are decompressed via a decompression algorithm that corresponds with the compression algorithm utilized by video server 102. After decompression, the video signals are translated, if necessary, to match the video format of attached video display device 126. Finally, the video signals are transmitted to video display device 126 via video port 132 allowing the remote participants to view the presentation being demonstrated on initiating computer 104.

In addition to receiving video signals from video server 102, video client 124 also receives signals from keyboard 128 and mouse 130 via keyboard port 134 and mouse port 136, respectively. A system user located at the remote video client site utilizes keyboard 128 and/or mouse 130 to enter input. This input may be the same as that described above for video server 102 or, alternatively, the input may correspond to authentication and authorization data. In the preferred embodiment, the system user or remote participant enters this data in response to prompts displayed on video display device 126. The prompt data video signals are generated by video server 102 and transmitted via communication path 114 from video server 102 to video display device 126. That is, communication path 114 transmits either the presentation video signals generated by initiating computer 104 or prompt data video signals generated by video server 102 to video display device 126. Additionally, communication path 114 transmits system user input generated by mouse 128 and/or keyboard 130 from video client 124 to video server 102. Initially, video server 102 utilizes this information to determine whether video client 124 may receive the presentation video signals. Thereafter, this user input allows the presentation to be interactive as discussed above with respect to mouse 106 and keyboard 108. The ability of video client 124 to directly accept signals from keyboard 128 and mouse 130 allows the presentation to be displayed remotely without the need for a computer at the remote presentation site.

However, in situations where it is desired to display the presentation at a location already equipped with a computer, such as remote computer 138, the system does not require a second video client 124. Rather, remote computer 138 receives video signals directly from video server 102 via communication path 116. Initially, when a remote participant using remote computer 138 attempts to receive the multicast video signals, video server 102 automatically downloads client software to remote computer 138 via communication path 116. After the software is installed, video server 102 will attempt to authenticate and authorize remote computer 138. If the attempt is successful, the remote computer 138 receives the multicast video signals from video server 102 via communication path 116.

According to the invention, any combination of video clients 124 may be combined with any number of remote computers 138. Additionally, each one of these devices may be connected to video server 102 via its own type of communication path 114 or 116. In other words, some video clients 124 or remote computers 138 may be connected to video server 102 via a corporate LAN or WAN, and these networked devices may operate with non-networked video clients 124 and remote computers 138 that are connected via direct cabling to form a single video transmission system.

Figure 2:
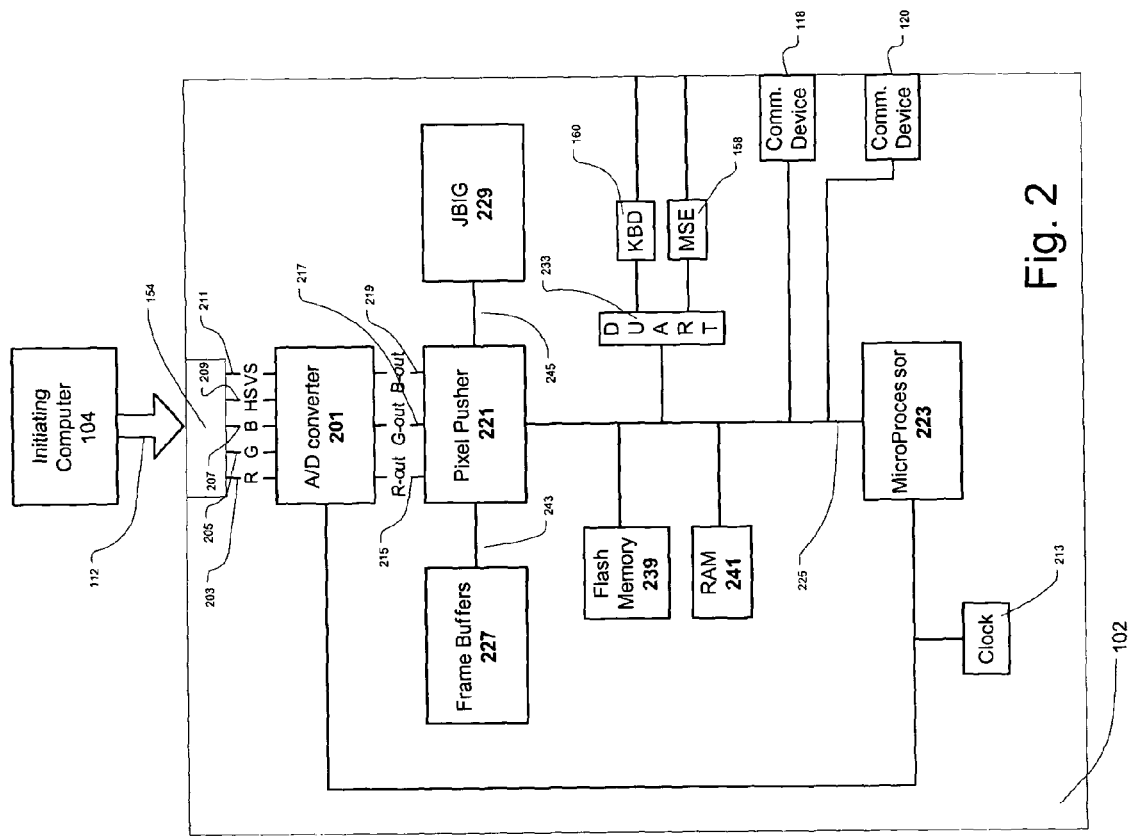
FIG. 2 depicts a block diagram of the preferred embodiment of the video server shown in FIG. 1 including the interface to the initiating computer and the communications device for interfacing to the remote participant locations.

Turning to FIG. 2, depicted is a block diagram of the circuitry of video server 102 shown in FIG. 1 according to the preferred embodiment of the invention. Preferably, video server 102 comprises A/D converter 201, pixel pusher 221, frame buffers 227, JBIG 229, flash memory 239, RAM 241, microprocessor 223, video-in port 154, Dual universal asynchronous receiver transmitter ("DUART") 233, mouse port 158, keyboard port 160, clock 213, and communications devices 118 and 120.

A/D converter 201 receives video signals from initiating computer 104 via communication path 112 through video in port 154. The first step in preparing the video for transmission is conversion of the video signals from analog signals to digital signals, which is performed by A/D converter 201. A/D converter 201 receives analog red signals, analog green signals, analog blue signals, horizontal synchronization signals, and vertical synchronization signals via conductors 203, 205, 207, 209, and 211, respectively. Clock 213 drives the timing of A/D converter 201 and microprocessor 223 using means commonly employed in the art. The outputs of A/D converter 201 are shown as R-out 215, G-out 217, and B-out 219, which represent the red component, green component, and blue component of the digitized video signal, respectively. A/D converter 201 outputs these digitized video signal components in the form of pixels, which are transmitted to and stored in pixel pusher 221. Pixel pusher 221, flash memory 239, and Random Access Memory ("RAM") 241 communicate with microprocessor 223 via communication bus 225. Pixel pusher 221 also communicates with frame buffers 227 (e.g., raw frame buffer, compare frame buffer, etc.) and compression device 229 via communication buses 243 and 245, respectively. The compression algorithm is executed by microprocessor 223. Generally, the compression algorithm operates as follows:

Noise Reduction and Difference Test:

As discussed above, digitization of the analog video signals is necessary to allow these signals to be transmitted via a digital communication medium (e.g., a network, LAN, WAN, Internet, etc.). However, a detrimental side effect of the digitization process is the introduction of quantization errors and noise into the video signals. Therefore, the Noise Reduction and Difference Test sub-algorithm ("NRDT sub-algorithm") is designed to reduce the noise introduced during the digitization of the video signals. In addition, the NRDT sub-algorithm simultaneously determines the differences between the recently captured frame of video (i.e., the "current frame") and the previously captured frame of video (i.e., the "compare frame").

First, the NRDT sub-algorithm divides the current frame, which is contained in the raw frame buffer, into 64×32 blocks of pixels. Alternatively, other sizes of blocks may be used (e.g., 8×8 pixels, 16×16 pixels, 32×32 pixels, etc.) based upon criteria such as the size of the entire video frame, the bandwidth of the communication medium, desired compression yield, etc.

After the current frame is divided into blocks, a two-level threshold model is applied to the block of pixels to determine whether it has changed with respect to the compare frame. These two thresholds are the pixel threshold and the block threshold.

First, a given pixel is examined and the value of each of the three colors (i.e., red, green, and blue) of the pixel is calculated with the value of its corresponding pixel in the compare frame. From this calculation, a distance value is computed. If the distance value is greater than the pixel threshold (i.e., the first threshold of the two-level threshold), this distance value is added to a distance sum. This process is performed for each pixel in the block.

Next, after the distance value of all of the pixels in the block have been calculated and processed in the aforementioned manner, the resulting value of the distance sum is compared to the block threshold (i.e., the second threshold of the two-level threshold). If the distance sum exceeds the block threshold, then this block of pixels is considered changed in comparison to the corresponding block of pixels in the compare frame. If a change is determined, the compare frame, which is stored in the compare frame buffer, will be updated with the new block of pixels. Furthermore, the new block of pixels will be further processed and transmitted in a compressed format to the remote presentation equipment.

In contrast, if the distance sum is not greater than the block threshold, the block of pixels is determined to be unchanged. Consequently, the compare frame buffer is not updated, and this block of pixels is not transmitted to the remote presentation equipment. Eliminating the transmission of unchanged blocks of pixels reduces the overall quantity of data to be transmitted, thereby increasing transmission time and decreasing the required bandwidth.

The NRDT sub-algorithm is ideal for locating both a large change in a small quantity of pixels and a small change in a large quantity of pixels. Consequently, the NRDT sub-algorithm is more efficient and more accurate than known percentage threshold algorithms that simply count the number of changed pixels in a block of pixels. With such an algorithm, if a few pixels within the block of pixels have changed drastically (e.g., from black to white), the algorithm would consider the block of pixels to be unchanged since the total number of changed pixels would not exceed the percentage threshold value. This result will often lead to display errors in the transmission of computer video.

Consider, for example, a user that is editing a document. If the user were to change a single letter, such as changing an "E" to an "F," only a few pixels of the video image would change. However, based upon this change, the resulting document is dramatically different than the original document. A percentage threshold algorithm would not register this change and, therefore, would lead to a display error. A percentage threshold algorithm, by only looking at the number of pixels within a block that have changed, generally fails to recognize a video image change in which a few pixels have changed substantially. However, the NRDT sub-algorithm used by the present invention, by virtue of its two-level threshold, will recognize that such a block of pixels has significantly changed between successive frames of video.
Smoothing:

When the NRDT sub-algorithm determines that a block of pixels has changed, the digital data that represents this block is further processed by a smoothing sub-algorithm. This sub-algorithm reduces the roughness of the video image that is caused by the noise introduced during the analog-to-digital conversion.

First, each digital pixel representation is converted to a representation that uses a lower quantity of bits for each pixel. It is known in the art to compress color video by using a fewer number of bits to represent each color of each pixel. For example, a common video standard uses 8 bits to represent each of the red, green, and blue components of a video signal. This representation is commonly referred to as an "8 bit RGB representation". If only the four most significant bits of the red, green, and blue components of the pixel are used to represent its color in lieu of all eight bits, the total amount of digital data used to represent the block of pixels, and frame of video, is reduced by fifty percent.

In contradistinction, the smoothing sub-algorithm incorporates a more intelligent method of reducing the size of an RGB representation. This method uses a Color Code Table ("CCT") to map specific RGB representations to more compact RGB representations. Both the compression and decompression algorithms of the present invention use the same CCT. However, different color code tables may be chosen depending on the available bandwidth, the capabilities of the local display device, etc.

For each block of pixels, a histogram of pixel values is created and sorted by frequency such that the smoothing sub-algorithm may determine how often each pixel value occurs. Pixel values that occur less frequently are compared to pixel values that occur more frequently. To determine how similar pixel values are, a distance value is calculated based upon the color values of the red, green, and blue ("RGB") components of each pixel. During the histogram analysis, a map of RGB values to color codes (i.e., a CCT) is created. If a less frequently occurring pixel value needs to be adjusted to a similar, more frequently occurring pixel value (i.e., color), the CCT is used to map the less frequently occurring pixel value to the color code of the more frequently occurring pixel value. Thus, the noise is efficiently removed from each block and the number of bits used to represent each pixel is reduced.

For illustrative purposes, suppose that an 8×8 pixel block is being processed. Further suppose that of the 64 pixels in the current block, 59 are blue, 4 are red, and 1 is light blue. Further assume that a low frequency threshold of 5 and a high frequency threshold of 25 are used. In other words, if a pixel value occurs less than 5 times within a block, it is considered to have a low frequency. Similarly, if a pixel value occurs more than 25 times within a block, it is considered to have a high frequency. In the preferred embodiment of the present invention, the smoothing sub-algorithm ignores pixel values occurring between these two thresholds. Therefore, in the present example, the smoothing sub-algorithm determines that the red and light blue pixels have a low frequency, and the blue pixels have a high frequency.

In the next step, the values of the 4 red pixels and the 1 light blue pixel are compared with the value of the blue pixels. In this step, a pre-determined distance threshold is used. If the distance between the less frequent pixel value and the more frequent pixel value is within this distance threshold, then the less frequent pixel value is converted to the more frequent pixel value. Therefore, in our present example, it is likely that the light blue pixel is close enough in value to the blue pixel that its distance is less than the distance threshold. Consequently, the light blue pixel is mapped to the blue pixel. In contrast, it is likely that the distance between the red and blue pixels exceeds the distance threshold and, therefore, the red pixel is not mapped to the blue pixel. With the smoothing sub-algorithm of the present invention, although the red pixels occur rarely, the distance between the red pixel value and the blue pixel value is large enough that the red pixels are not converted to blue pixels. In this manner, the smoothing sub-algorithm of the present invention increases the redundancy in compared images by eliminating changes caused by superfluous noise introduced during the analog-to-digital conversion while retaining real changes in the video image.
Caching:

After the smoothing sub-algorithm has been applied to the digital video image data, an optional caching sub-algorithm may be applied to further minimize the bandwidth required for transmitting the video images. The caching sub-algorithm relies on a cache of previously transmitted blocks of pixels. Similar to the NRDT sub-algorithm, the caching sub-algorithm is performed on a block of pixels within the video frame. Again, any block size may be used (e.g., 8×8, 16×16, 32×32 or 64×32).

First, the caching sub-algorithm performs a cache check, which compares the current block of pixels with blocks of pixels stored in the cache. The cache may store an arbitrarily large number of previous frames. Cache hits are likely to occur a higher percentage of the time if a large cache is incorporated. However, memory and hardware requirements increase when the size of the cache is increased. Furthermore, the number of comparisons, and thus the processing power requirements, also increases when the size of the cache increases.

A "cache hit" occurs when a matching block of pixels is located within the cache. A "cache miss" occurs if a matching block of pixels is not found in the cache. When a cache hit occurs, the new block of pixels does not have to be retransmitted. Instead, a message and a cache entry identification ("ID") are sent to the remote participant equipment. Generally, this message and cache entry ID will consume less bandwidth than that required to transmit an entire block of pixels.

If a "cache miss" occurs, the new block of pixels is compressed and transmitted to the remote participant locations. Also, both the remote and local devices update their respective cache by storing the new block of pixels in the cache. Since the cache is of limited size, older data is overwritten. One skilled in the art is aware that various algorithms can be used to decide which older data should be overwritten. For example, a simple algorithm can be employed to overwrite the oldest block of pixels within the cache, wherein the oldest block is defined as the least recently transmitted block.

In order to search for a cache hit, the new block of pixels must be compared with all corresponding blocks of pixels located within the cache. There are several ways in which this may be performed. In one embodiment, a cyclic redundancy check ("CRC") is computed for the new block of pixels and all corresponding blocks of pixels. The CRC is similar to a hash code for the block. A hash code is a smaller, yet unique, representation of a larger data source. Thus, if the CRCs are unique, the cache check process can compare CRCs for a match instead of comparing the whole block of pixels. If the CRC of the current block of pixels matches the CRC of any of the blocks of pixels in the cache, a "cache hit" has been found. Because the CRC is a smaller representation of the block, less processing power is needed to compare CRCs. Furthermore, it is possible to construct a cache in which only the CRCs of blocks of pixels are stored at the remote participant locations. Thus, using a CRC comparison in lieu of a block of pixels comparison saves memory and processor time, which results in a lower cost.

Bit Splicing/Compression:

Once the NRDT, smoothing, and optional caching sub-algorithms are performed, each block of pixels that must be transmitted is ready to be compressed. In the preferred embodiment of the present invention, each block is compressed using the Joint Bi-level Image Group ("JBIG") lossless compression algorithm.

The JBIG compression algorithm was designed for black and white images, such as those transmitted by facsimile machines. However, the compression algorithm utilized by the present invention compresses and transmits color video images. Therefore, when utilizing the JBIG compression algorithm, the color video image must be bit-sliced, and the resulting bit-planes must be compressed separately.

A bit plane of a color video image is created by grabbing a single bit from each pixel color value in the color video image. For example, if 8 bits are used to represent the color of the pixel, then the color video image is divided into 8 bit planes. The compression algorithm works in conjunction with the CCT discussed above to transmit the bit plane containing the most significant bits first, the bit plane containing the second most significant bits second, etc. The CCT is designed such that the most significant bits of each pixel color are stored first and the lesser significant bits are stored last. Consequently, the bit planes transmitted first will always contain the most significant data, and the bit planes transmitted last will always contain the least significant data. Thus, the remote video display devices will receive video from the initiating computer progressively, receiving and displaying the most significant bits of the image before receiving the remaining bits. Such a method is less sensitive to changes in bandwidth and will allow a user to see the frame of video as it is transmitted, rather than waiting for all details of the frame to be sent.

After compression of the video signals is complete, the resulting video signals are transmitted via communication bus 225 to communication devices 118 and 120. Then, the digitized and compressed video signals are transmitted via communication devices 118 and 120 to the attached communication medium, which transmits the video signals to the intended video client(s) 124 or remote computer(s) 138 (FIG. 1).

Dual universal asynchronous receiver transmitter ("DUART") 233 also communicates with microprocessor 223 via communication bus 225. DUART 233 also interfaces with keyboard port 160 and mouse port 158. Thus, DUART 233 receives keyboard and mouse signals generated at keyboard 108 and mouse 106 (FIG. 1) via keyboard port 160 and mouse port 158, whereupon they are processed by DUART 233 and transmitted via communication bus 225 to microprocessor 223.

Figure 3A:
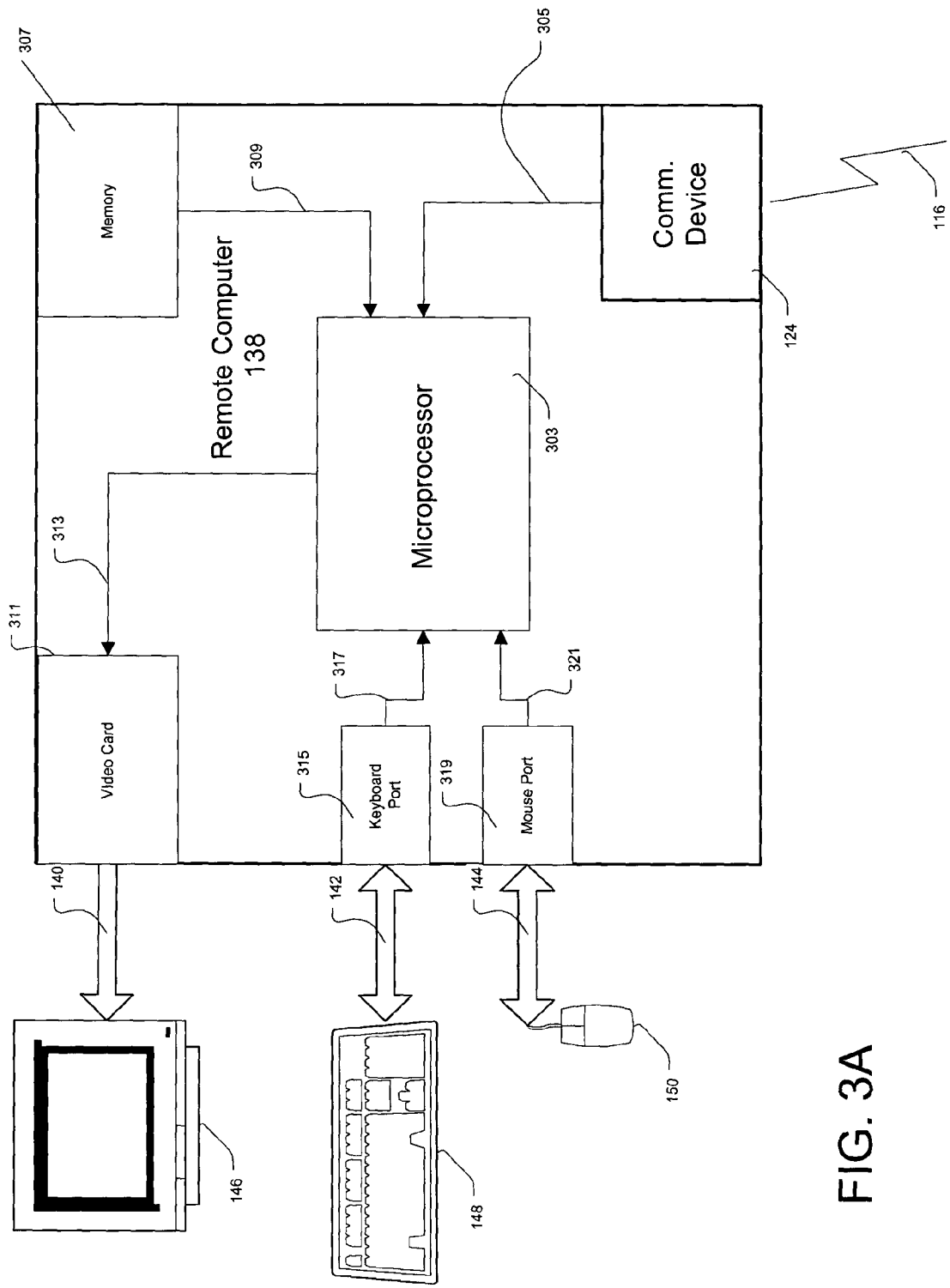
FIG. 3A depicts a block diagram of a remote computer which, in one embodiment of the invention, performs the decompression according to the invention.

Referring next to FIG. 3A, illustrated is a block diagram of the internal circuitry of remote computer 138 shown in FIG. 1. As shown, remote computer 138 contains microprocessor 303, which executes the decompression algorithm (discussed in further detail below with respect to FIG. 8). Remote computer 138 additionally contains video card 311, keyboard port 315, mouse port 319, memory 307, and communications device 124. Microprocessor 303 receives data (i.e., video signal data, control data, etc.) from communication device 124 via communication bus 305. Communication device 124 may utilize shared memory, a memory bus, and/or drivers to perform such data transmission.

Communication device 124 receives data from video server 102 via communications path 116 (FIG. 1). When a potential presentation participant wishes to connect to a multicast presentation via remote computer 138, microprocessor 303 executes the decompression algorithm, which is stored in computer readable medium 307, via communication bus 309. The decompression algorithm decompresses the data received from communication device 124 and converts the data into a format that is compatible with video card 311. The properly formatted data is then transmitted to video card 311 via communication bus 313, whereupon video signals are generated for display and are transmitted via communication path 140 to video display device 146.

In addition, microprocessor 303 receives keyboard and mouse signals. Keyboard signals generated at keyboard 148 are transmitted via communication path 142 through keyboard port 315 to communication bus 317 to microprocessor 303. In a similar manner, mouse signals generated at mouse 150 are transmitted via communication path 144 through mouse port 319 to communication bus 321 to microprocessor 303.

Figure 3B:
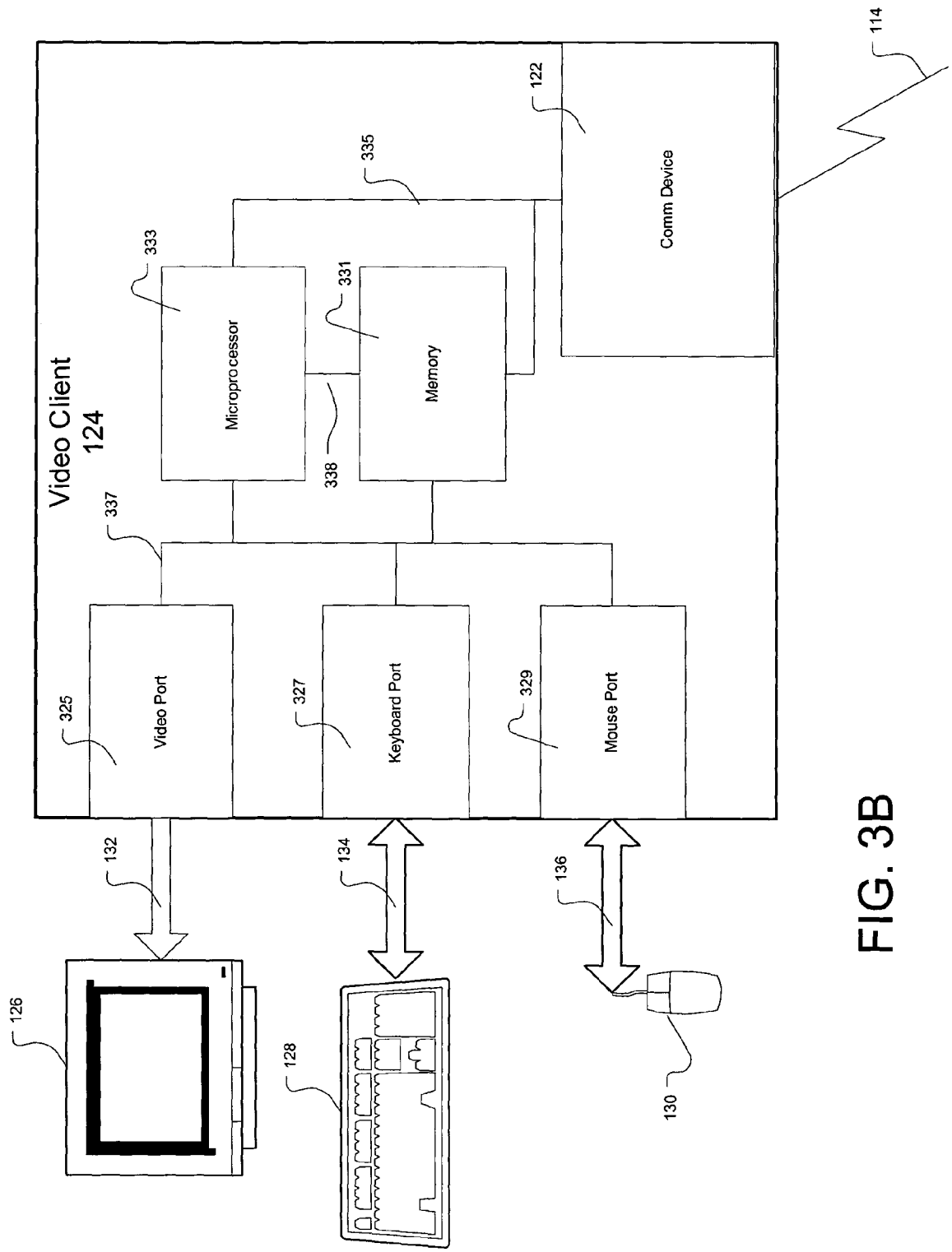
FIG. 3B depicts a block diagram of an independent hardware device referred to herein as the video client, which, in another embodiment of the invention, performs the decompression according to the invention.

Although the video transmission system of the present invention allows an existing, networked or non-networked personal computer to be used to display a multicast presentation, a computer is not required. FIG. 3B depicts a block diagram of the circuitry of the preferred embodiment of video client 124 of the present invention. That is, video client 124 has the ability to display the presentation on video display device 126 without the need for a personal computer. Video display unit 126, keyboard 128, and mouse 130 receives signals from video port 325, keyboard port 327, and mouse port 329 of video client 124 via communication paths 132, 134, and 136, respectively.

Communication device 122 receives data from video server 102 via communications path 114. When a potential presentation participant wishes to connect to a multicast presentation via video client 124, microprocessor 333 executes the decompression algorithm, which is stored in memory 331, via communication bus 338. The decompression algorithm decompresses the data received from communication device 122 and converts the data into a format that is compatible with video display unit 126. The properly formatted data is then transmitted to video port 325 via communication bus 337, whereupon video signals are generated for display and are transmitted via communication path 132 to video display device 126.

In addition, microprocessor 333 receives keyboard and mouse signals generated at keyboard 128 that are transmitted via communication path 134, keyboard port 327, and communication bus 337 to microprocessor 333. In a similar manner, mouse signals generated at mouse 130 are transmitted via communication path 136, mouse port 329, and communication bus 337 to microprocessor 333.

Figure 4:
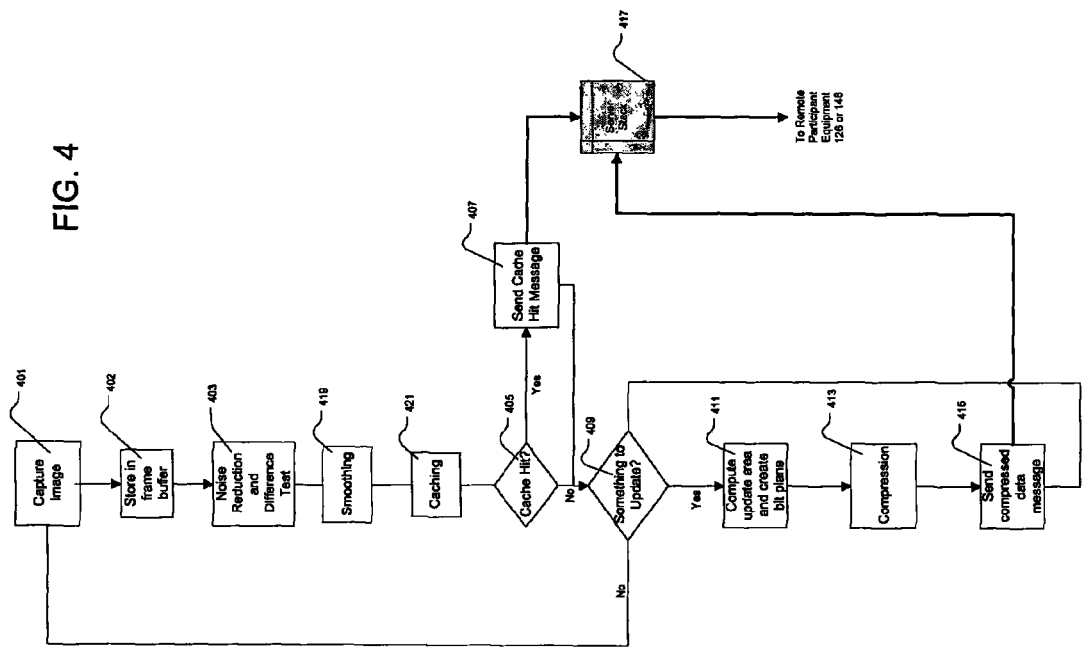
FIG. 4 depicts a flowchart of the compression algorithm utilized by the preferred embodiment of the present invention.

Referring now to FIG. 4, depicted is a flowchart illustrating the operation of the compression algorithm utilized in the preferred embodiment of the present invention. The compression algorithm is executed internal to video server 102 by microprocessor 223 (FIG. 2). Prior to processing the video signal data, the video image must be captured (step 401). The data is captured from initiating computer 104 by A/D converter 201 via video in port 154 (FIG. 2) at a speed of at least 20 frames/second. A/D converter 201 and pixel pusher 221 then convert the analog video signals to a digital representation of pixels, with each pixel represented as 5 bits for red, 5 bits for blue, and 5 bits for green. Thereafter, this unprocessed pixel data is stored in a raw frame buffer (step 402), which is one of the frame buffers 227 (FIG. 2). At this point, the compression algorithm is performed to process the captured video data contained in the raw frame buffer and prepare it for multicasting to remote participant locations.

The first step of the compression algorithm is the NRDT (step 403). The NRDT sub-algorithm is also executed internal to video server 102 by microprocessor 223 (FIG. 2). The NRDT sub-algorithm determines which blocks of pixels, if any, have changed between the current frame and the compare frame.

In the preferred embodiment, the video frame is first divided into 64×32 pixel blocks. Subsequently, the NRDT sub-algorithm is applied to each block of pixels independently. Alternative embodiments of the present invention may utilize smaller or larger blocks depending on criteria such as desired video resolution, available bandwidth, etc.

Next, the NRDT sub-algorithm employs a two-threshold model to determine whether differences exist between a block of pixels in the current frame and the corresponding block of pixels in the compare frame. These two thresholds are the pixel threshold and the block threshold.

First, each pixel of the pixel block is examined to determine if that pixel has changed relative to the corresponding pixel of the corresponding block in the compare frame. The distance value of each of the three colors (i.e., red, green, and blue) of each pixel in relation to the corresponding compare pixel is calculated, as described in greater detail below with respect to FIG. 7. If the distance value is larger than the pixel threshold (i.e., the first threshold of the two-threshold model), this distance value is added to a distance sum value.

Then, after all pixels within the pixel block have been examined, if the resulting distance sum value is greater than the block threshold (i.e., the second threshold of the two-threshold model), the block is determined to have changed. Every block of pixels in the video frame undergoes the same process. Therefore, after this process has been applied to an entire video frame, the process will have identified all pixel blocks that the process has determined have changed since the previous video frame. At this point, the compare frame is updated with the changed pixel blocks. However, the pixel blocks of the compare frame that correspond to unchanged pixel blocks of the current frame will remain unchanged. In this manner, the two-threshold model used by the NRDT sub-algorithm eliminates pixel value changes that are introduced by noise created during the analog to digital conversion and also captures the real changes in the video frame.

After the video data is processed by the NRDT sub-algorithm, it is next processed by the smoothing sub-algorithm (step 419). The smoothing sub-algorithm is designed to create a smooth, high-quality video image by reducing the roughness of the video image caused by noise introduced during the analog to digital conversion.

The smoothing sub-algorithm first converts the pixel representation that resulted from the NRDT sub-algorithm into a pixel representation that uses a lesser quantity of bits to represent each pixel. This is performed using a CCT that is specially organized to minimize the size of the pixel representation. The smoothing sub-algorithm uses the CCT to choose color codes with the least number of 1-bits for the most commonly used colors. For example, white and black are assumed to be very common colors. Thus, white is always assigned 0 and black is always assigned 1. That is, white will be represented by a bit value of 0 on all planes. Black, the next most common color, will show up as a bit value of 0 on all but one plane. This reduces the quantity of data to be compressed by the compression algorithm. Then, for each pixel in the block, a color code is assigned. Simultaneously, a histogram of color codes is created to store the number of occurrences of each of the unique colors in the block of pixels. This histogram of color codes is then sorted to produce a list of color codes from the least number of occurrences to the dominant number of occurrences.

Once the sorted list of color codes is created, the next step is to merge colors. Working from the beginning of the sorted list, the smoothing sub-algorithm compares the least frequently occurring colors to the more frequently occurring colors. If the less frequently occurring color is very similar to a more frequently occurring color, then the pixels having the less frequently occurring color will be changed to the more frequently occurring color. Determination of whether two colors are similar is performed by calculating the distance between the three-dimensional points of the RGB space. The formula is:

$$D=\sqrt{(R_1-R_2)^2+(G_1-G_2)^2+(B_1-B_2)^2}$$

where D is the distance, $R_1$ is the red value of the low frequency pixel, $R_2$ is the red value of the high frequency pixel, $G_1$ is the green value of the low frequency pixel, $G_2$ is the green value of the high frequency pixel, $B_1$ is the blue value of the low frequency pixel, and $B_2$ is the blue value of the high frequency pixel.

If the distance is within a distance threshold, the two colors are determined to be similar. In the preferred embodiment of the present invention, system performance is increased by squaring the distance threshold and comparing this value with the sum of the squares of the RGB differences. This step eliminates taking the square root of the sum, which requires a greater amount of processing time.

Each block of pixels is filtered for noise and translated from a RGB representation to a color code representation. The noise that is introduced by A/D converter 201 (FIG. 2) during conversion of the analog signals to digital signals distorts the values of some pixels. Thus, the smoothing sub-algorithm is designed to recognize distorted pixels and adjust them to the correct value. The smoothing sub-algorithm minimizes noise by reducing the number of different colors present in each video image block. Such smoothing creates an image with greater redundancy, thus yielding higher compression ratios.

After smoothing, caching is performed (step 421). Caching is a sub-algorithm of the overall compression algorithm executed by microprocessor 223 of video server 102 (FIG. 2). Caching requires video server 102 (FIG. 2) to retain a cache of recently transmitted images. Such a cache can be implemented and stored in RAM 241 (FIG. 2). The caching sub-algorithm compares the most recent block of pixels with the corresponding block of pixels in the video images stored in the cache (step 405). If the most recently transmitted block of pixels is the same as one of the corresponding blocks of pixels stored in the cache, the caching sub-algorithm does not retransmit this portion of the video image. Instead, a "cache hit" message is sent to the remote participant equipment, which indicates that the most recently transmitted block is already stored in the cache (step 407). The "cache hit" message contains information regarding which cache contains the corresponding block of pixels, thereby allowing the remote participation equipment to retrieve the block of pixels from its cache and use it do create the video image to be displayed on its attached video display device.

The next step in the process, step 409, determines if the NRDT determined that the block of pixels has changed since the corresponding block of pixels in the compare frame. This step can also be implemented before or in parallel with step 405. Also, steps 421, 405, and 407 may be eliminated entirely.

The main purpose of step 409 is to determine whether the block has changed since the last frame. If the block has not changed, there is no need to send an updated block to the remote participant equipment. Otherwise, if the block of pixels has changed, it is prepared for compression (step 411). In the preferred embodiment, step 409 uses a different technique than step 405. With two ways of checking for redundancy, higher compression will result. Both steps 409 and 411 are executed by a caching sub-algorithm executed by microprocessor 223 of video server 102 (FIG. 2).

For any areas of the image that have changed, the cache is updated, and the data is compressed before being sent to the server stack. In the preferred embodiment, the image is compressed using IBM's JBIG compression algorithm. JBIG is designed to compress black and white images. However, the present invention is designed to transmit color video images. Therefore, bit planes of the image are extracted (step 411), and each bit plane is compressed separately (step 413). Finally, the compressed image is transmitted to server stack 417 (step 415), which transmits the data to the remote participant equipment. Server stack 417, implemented with communication devices 118 and 120 (FIG. 2), enables the compressed video to be sent to remote participant equipment 124 and 138 using any of the various communication mediums or protocols discussed above.

Figure 5A:
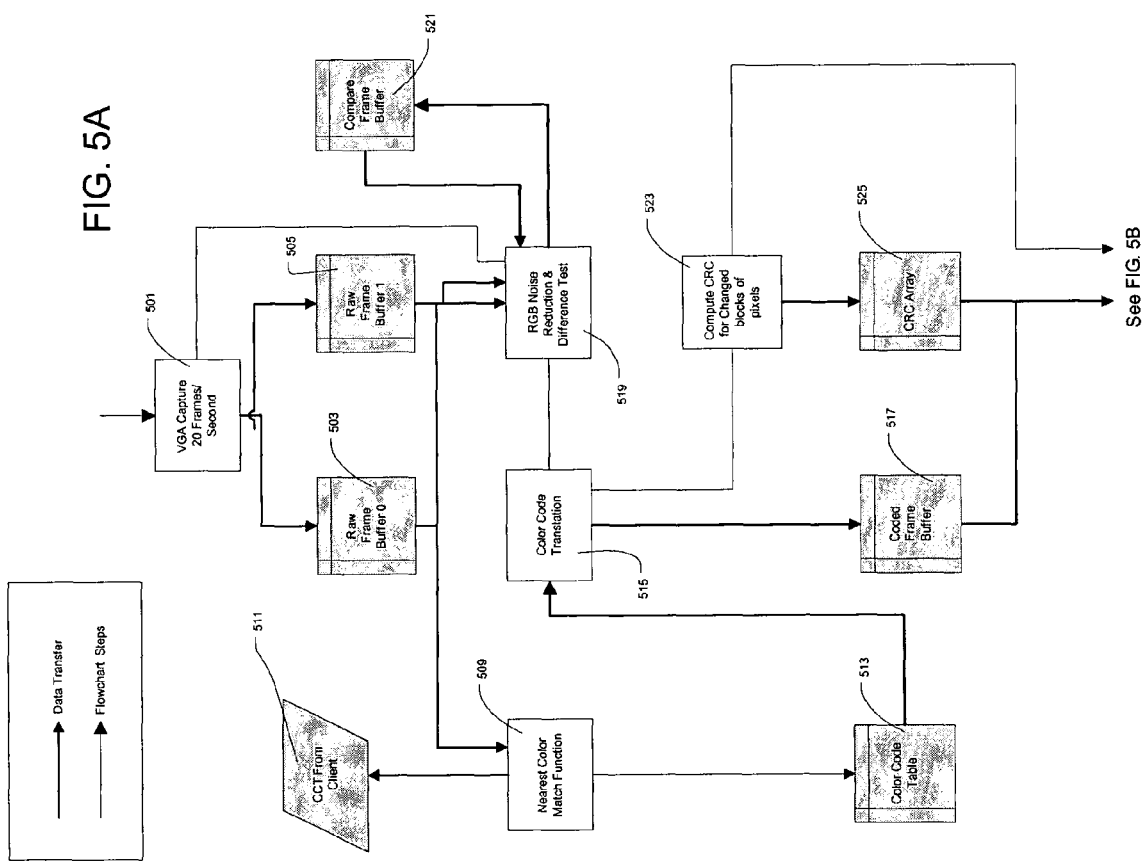
FIG. 5A depicts a detailed flowchart of the NRDT and smoothing sub-algorithms of the compression algorithm shown in FIG. 4.
Figure 5B:
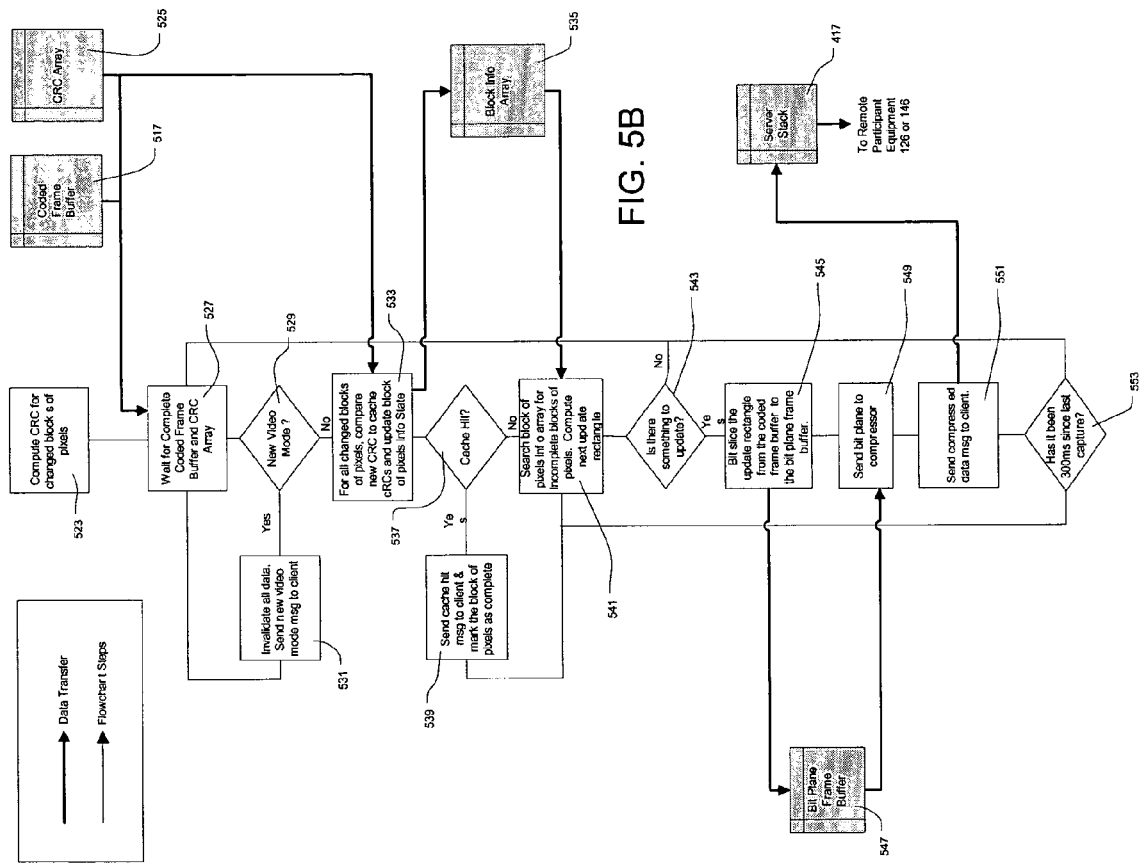
FIG. 5B depicts a detailed flowchart of the caching and bit splicing/compression sub-algorithms of the compression algorithm shown in FIG. 4.

FIGS. 5A and 5B provide detailed flowcharts of a preferred embodiment of the compression process. As seen in FIG. 5A, the video capture is done at a rate of 20 frames per second (step 501). VGA capture block is implemented by A/D converter 201 (FIG. 2). Standard monitors often update at refresh rates as high as 70 times per second. As a rate of 20 frames per second is significantly less frequent, this step limits the amount of data that is captured from the computer. Thus, this first step reduces the bandwidth needed to transmit the video.

In this embodiment, the data is outputted in RGB format where 5 bits are allocated to each color. This allows for the representation of 32,768 unique colors. However, other formats capable of storing more or less colors may be used depending on the needs of the users and the total available bandwidth.

The digital representation of the captured video image created in step 501 is transferred and stored in either frame buffer 0 503 or frame buffer 1 505. A frame buffer is an area of memory that is capable of storing one frame of video. The use of two frame buffers allows faster capture of image data. The captured frames of video are stored in frame buffer 0 503 and frame buffer 1 505 in an alternating manner. This allows the next frame of video to be captured while compression is being performed on the previous frame of video. In video server 102, frame buffer 0 503 and frame buffer 1 505 comprise a portion of frame buffers 227 (FIG. 2).

An NRDT test is performed on each block of pixels stored in raw frame buffer 0 503 and raw frame buffer 1 505 (step 519), which compares each block of the captured video image to the corresponding block of the previously captured video image. Step 519 compares blocks of pixels from the video image stored in the current raw frame buffer (i.e., raw frame buffer 0 503 or raw frame buffer 1 505) with the corresponding block of pixels stored in compare frame buffer 521. This step is discussed in greater detail below with respect to FIGS. 7A and 7B.

If step 519 determines that the current block of pixels has changed, then nearest color match function processes the video images contained in raw frame buffer 0 503 and raw frame buffer 1 505 (step 509) in conjunction with the information contained in the client color code table ("CCT from client") 511, which is stored in flash memory 239 (FIG. 2). The nearest color match function can be executed as software by microprocessor 223. A detailed explanation of the nearest color match function is provided below with respect to FIG. 6.

The CCT obtained from CCT 513 by the nearest color match function is used for color code translation (step 515), which translates the digital RGB representation of each pixel of the changed block of pixels to reduce the amount of digital data required to represent the video data. Color code translation (step 515) receives blocks of pixels that the NRDT sub-algorithm (step 519) has determined have changed relative to the previous captured video image. Color code translation then translates this digital data into a more compact form and stores the result in coded frame buffer 517. Coded frame buffer 517 can be implemented as a portion of RAM 241 (FIG. 2).

Alternatively, steps 509 and 515 may be performed in parallel with step 519. Performing these steps in parallel will reduce the overall amount of processing time required for each block of pixels that has changed. In this scenario, steps 509 and 515 are performed in anticipation of the block of pixels having changed. If this is the case, the processing for steps 509 and 515 may be completed at the same time as the processing for step 519 is completed. Therefore, the algorithm may move directly to step 523 from step 509 without having to wait for the processing of steps 509 and 515. Otherwise, if step 519 determines that the block of pixels has not changed, and therefore the results of steps 509 and 515 are not required, these results may simply be discarded.

Upon completion of step 515, caching begins by performing a cyclical redundancy check (CRC) (step 523). Cyclic redundancy check (CRC) is a method known in the art for producing a checksum or hash code of a particular block of data. The CRCs may be computed for two blocks of data and then compared. If the CRCs match, the blocks are the same.

Thus, CRCs are commonly used to check for errors. Often, a CRC will be appended to a block of transmitted data so that the receiver can verify that the correct data is received. However, in the present invention, the CRC is used to compare a block of pixels with blocks of pixels stored in a cache. Thus, in step 523, the CRC is computed for each block of pixels that was determined to have changed by the NRDT sub-algorithm. The array of CRCs is stored in CRC array 525. Turning next to FIG. 5B, depicted is an overview of the caching and bit splicing/compression sub-algorithms. This portion of the algorithm begins waiting for information from coded frame buffer 517 and CRC array 525 (step 527). Next, a decision is made as to whether a new video mode has been declared (step 529). A new video mode can be declared if, for example, a new piece of remote participant equipment is connected to the video transmission system that has different bandwidth or color requirements. If a new video mode has been declared, all data is invalidated (step 531) and the sub-algorithm returns to step 527 to wait for new information from coded frame buffer 517 and CRC array 525. Steps 527, 529, and 531 are all steps of the overall compression algorithm that is executed by microprocessor 223.

If in step 529 it is deemed that a new video mode has not been declared, then the comparison of the current block of pixel's CRC with the cached CRCs is performed (step 533). This block compares the CRC data of the current video frame contained in CRC array 525 with the cache of previous CRCs contained in block info array 535. Block info array 535 stores the cache of pixel blocks and the CRCs of the pixel blocks and can be implemented as a device in RAM 241 (FIG. 2). Step 533 is also a part of the overall compression algorithm executed by microprocessor 223.

Next, a determination is made as to whether the current block of pixels is located within the pixel block cache contained in block info array 535 (step 537). If it is, a cache hit message is sent to the remote participation equipment and the block of pixels is marked as complete, or processed (step 539). Since the remote participation equipment contains the same pixel block cache as video server 102 (FIG. 2), the cache hit message simply directs the remote participation equipment to use a specific block of pixels contained in its cache to create the portion of the video image that corresponds to the processed block of pixels.

Next, a check is performed for unprocessed blocks of pixels (step 539). All blocks of pixels that need to be processed, or updated, are combined to create a compute next update rectangle. If there is nothing to update (i.e., if the video has not changed between frames), then the algorithm returns to step 527 (step 543). Thus, the current frame will not be sent to the remote participation equipment. By eliminating the retransmission of a current frame of video, the sub-algorithm reduces the bandwidth required for transmitting the video.

If, however, there are areas of the image that need to be updated, the update rectangle is first compressed. The update rectangle must first be bit sliced (step 545). A bit plane of the update rectangle is constructed by taking the same bit from each pixel of the update rectangle. Thus, if the update rectangle includes 8-bit pixels, it can be deconstructed into 8 bit planes. The resulting bit planes are stored in bit plane buffer 547. Again, steps 541, 543, and 545 are all part of the bit splicing/compression sub-algorithm executed by microprocessor 223 of video server 102 (FIG. 2).

Each bit plane is compressed separately by the compression sub-algorithm (step 549). In this case, compression is performed on each bit plane and the resulting data is sent to server stack 417 (step 551). In the preferred embodiment, compression is performed by JBIG 229 (FIG. 2) (step 549).

Thereafter, the compressed bit planes are sent to the remote participant equipment via communication device 118 or 120.

Since the preferred embodiment captures frames 20 times per second, it is necessary to wait 300 ms between video frame captures. Thus, the algorithm will wait until 300 ms have passed since the previous frame capture before returning the sub-algorithm to step 527 (step 553).

Referring now to FIG. 6, illustrated is the nearest color match function (step 509 of FIG. 5A) that selectively converts less frequently occurring colors to more frequently occurring colors by mapping the less frequently occurring colors to the more frequently occurring colors via use of a CCT. Nearest color match function 509 processes one block of pixels of the video image stored in raw frame buffer 0 503 or raw frame buffer 1 505 at a time. As shown in FIG. 6, a block of pixels is extracted from the video image stored in raw frame buffer 0 503 or raw frame buffer 1 505 (step 600). In the preferred embodiment, the extracted block has a size of 64 by 32 pixels. However, nearest color match function 509 may process blocks having any size.

The goal of the nearest color match function is to eliminate noise introduced by the A/D conversion. This is accomplished by converting less frequently occurring pixel values to similar, more frequently occurring pixel values. This is done primarily via histogram analysis and difference calculations. Nearest color match function 509 generates a histogram of pixel values (step 601). The histogram measures the frequency of each pixel value in the block of pixels extracted during step 600. The histogram is sorted, such that a list of frequently occurring colors (popular color list 603) and a list of least frequently occurring colors (rare color list 605) are generated. The threshold for each list is adjustable.

Nearest color match function 509 analyzes each low frequently occurring pixel to determine if the pixel should be mapped to a value that occurs often. First, a pixel value is chosen from rare color list 605 (step 607). Then, a pixel value is chosen from popular color list 603 (step 609). These distance between these two values is then computed (step 611). In this process, distance is a metric computed by comparing the separate red, green and blue values of the two pixels. The distance value, D, can be computed in a variety of ways. One such example is:

$$D=(R_1-R_2)^2+(G_1-G_2)^2+(B_1-B_2)^2$$

In this formula, R1 is the red value of the low frequency pixel, R2 is the red value of the high frequency pixel, G1 is the green value of the low frequency pixel, G2 is the green value of the high frequency pixel, B1 is the blue value of the low frequency pixel, and B2 is the blue value of the high frequency pixel.

This formula yields a distance value, D, which indicates the magnitude of the similarity or difference of the colors of two pixels, such as a less frequently occurring pixel versus a more frequently occurring pixel. The goal of the sub-algorithm is to find a more frequently occurring pixel having a color that yields the lowest distance value when compared to the color of a less frequently occurring pixel. Therefore, a comparison is performed for each computed distance value (step 613). Every time a distance value is computed that is less than all previous distance values, the distance value is written to the closest distance variable (step 615).

Once it is determined that all more frequently occurring pixels have been compared to less frequently occurring pixels (step 617), a computation is performed to see if the lowest occurring D is within a predefined threshold (step 619). If this D is within the threshold, CCT 513 is updated by mapping the low frequently occurring pixel to the color code value of the high frequently occurring pixel that yielded this D value (step 621). This process is repeated for all low frequency pixels and CCT 513 is updated accordingly.

Turning to FIG. 7A, RGB NRDT step 519 (FIG. 5A) is illustrated in further detail. This process operates on every block of pixels. Current pixel block 700 represents a block of pixels of the video image contained in the current raw frame buffer (i.e., raw frame buffer 0 503 or raw frame buffer 1 505 (FIG. 5A)). Previous pixel block 701 contains the corresponding block of pixels of the video image contained in compare frame buffer 521 (FIG. 5A). Step 519 begins by extracting corresponding pixel values for one pixel from the current pixel block 700 and previous pixel block 701 (step 703). Then, the pixel color values are used to calculate a distance value, which indicates the magnitude of the similarity or difference between the colors of the two pixels (step 705). In the preferred embodiment of the present invention, the distance value is computed using the following formula:

$$D=(R_1-R_2)^2+(G_1-G_2)^2+(B_1-B_2)^2$$

As before, R1, G1, and B1 are the red, green and blue values respectively of the frame buffer pixel. Similarly, R2, G2, and B2 are the red, green and blue values respectively for the compare frame buffer pixel.

Next, the computed distance value D is compared with a pixel threshold (step 707). If D is greater than the pixel threshold, it is added to an accumulating distance sum (step 709). If the value of D is less than the pixel threshold, the difference is considered to be insignificant or noise, and it is not added to the distance sum.

This process of computing distance values and summing distance values that are greater than a predefined pixel threshold continues until it is determined that the last pixel of the block of pixels has been processed (step 711). Once the last pixel is reached, the distance sum is compared with a second threshold, the block threshold (step 713). If the distance sum is greater than the block threshold, the current block of pixels designated as changed as compared to the corresponding block of pixels from the previously captured frame. Otherwise, if the distance sum is less than the block threshold, the block of pixels is designated as unchanged.

If the block of pixels is designated as changed, step 715 is executed. Step 715 sets a flag that indicates that the particular block of pixels has changed. This flag is transmitted to all of the remote participant equipment. Furthermore, the new block of pixels is written to compare frame buffer 521 (FIG. 5A) to replace the corresponding previous block of pixels.

Otherwise, if the distance sum does not exceed the block threshold, the block is designated unchanged and, a flag is set to indicate that this block of pixels does not need to be re-transmitted to the remote participation equipment (step 721). Rather, the remote participation equipment will recreate the portion of the video image represented by the block of pixels using the same block of pixels displayed for the previous frame of video. At this point, the system computes CRCs for changed blocks of pixels (step 523 of FIG. 5A), as discussed in greater detail above with respect to FIG. 5A.

Figure 7B:
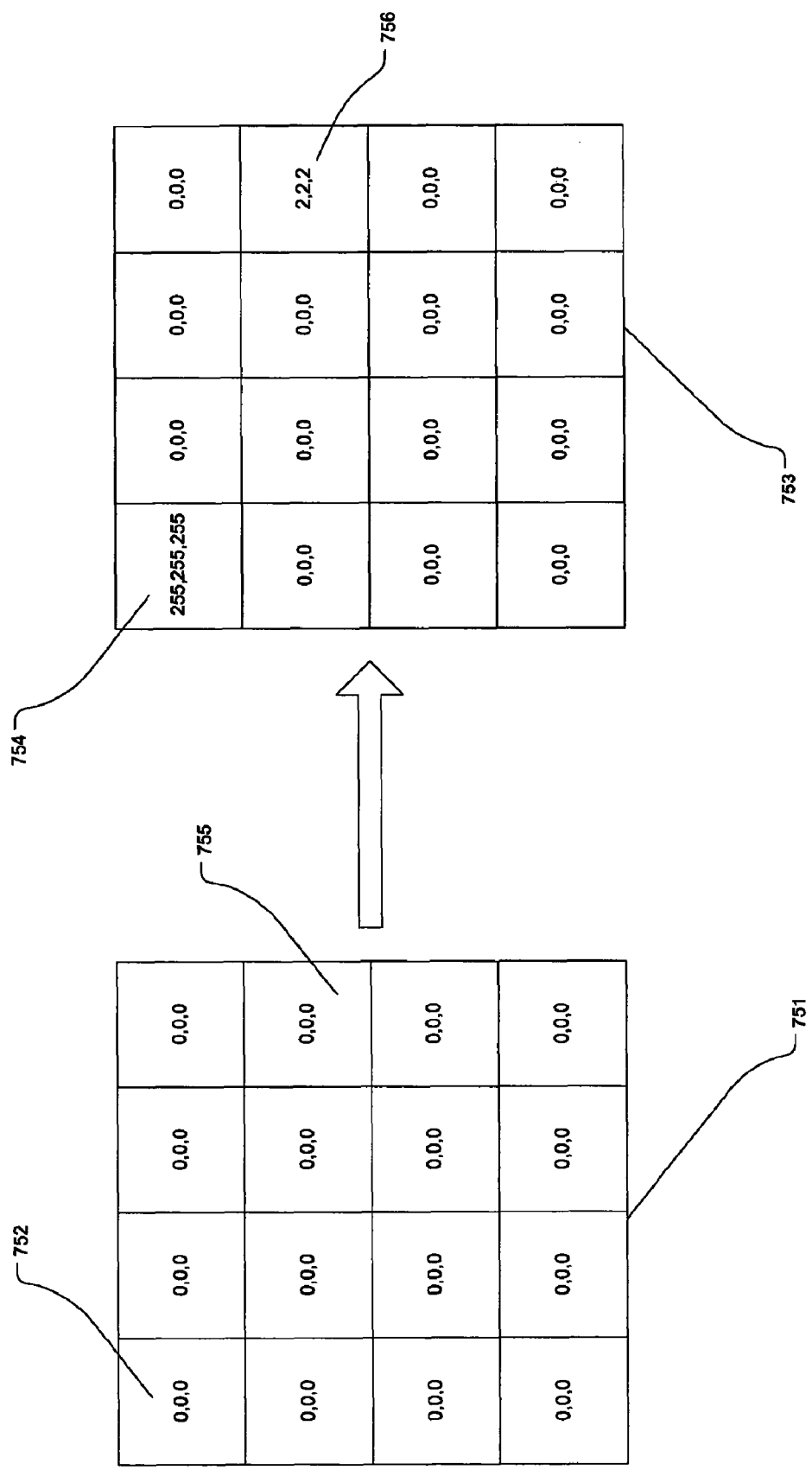
FIG. 7B depicts an example application of the NRDT sub-algorithm to a sample block of pixels as performed by the compression algorithm of the present invention.

FIG. 7B further illustrates the two level thresholding used by the NRDT sub-algorithm shown in FIG. 7A. For illustration purposes only, 4×4 blocks of pixels are shown. Each pixel is given red, green, and blue color values that range from 0 to 255, as is commonly performed in the art. A pixel having red, green, and blue values of 0 represents a black pixel, whereas a pixel having red, green, and blue values of 255 represents a white pixel. Previous pixel block 751 is a block of pixels grabbed from compare frame buffer 521 (FIG. 5A). Previous pixel 1 752 is the pixel in the upper, left corner of previous pixel block 751. Since every pixel of previous pixel block 751 has a value of 0, previous pixel block 751 represents a 4×4 pixel area that is completely black.

Current pixel block 753 represents the same spatial area of the video frame as previous pixel block 751, but it is one frame later. Here current pixel 1 754 is the same pixel 1 as previous pixel 1 752, but is one frame later. For simplicity, suppose a small white object, such as a white cursor, enters the area of the video image represented by previous pixel block 751. This change occurs in current pixel 1 754 of current pixel block 753. In current pixel block 753, the majority of the pixels remained black, but current pixel 1 754 is now white, as represented by the RGB color values of 255, 255, and 255.

Further suppose that noise has been introduced by the A/D conversion, such that previous pixel 755 has changed from black, as represented by its RGB values of 0, 0, and 0, to gray. The new gray color is represented by the RGB values of 2, 2, and 2 assigned to current pixel 756.

Further suppose that the pixel threshold is 100, and the block threshold is 200. The NRDT sub-algorithm calculates the distance value between each pixel of current pixel block 753 and previous pixel block 751. The formula used in the preferred embodiment of the present invention, as discussed above with respect to FIG. 7A, is:

$$D=(R_1-R_2)^2+(G_1-G_2)^2+(B_1-B_2)^2$$

Therefore, the distance value between current pixel 1 754 and previous pixel 1 752 is:

$$D=(255-0)^2+(255-0)^2+(255-0)^2$$

or 195,075. This distance value is added to the distance sum because 195,075 exceeds the pixel threshold of 100. However, the distance value between the black previous pixel 755 and the gray current pixel 756 is not added to the distance sum because the distance between the pixels, as calculated using the above distance formula, equals 12, which does not exceed the pixel threshold of 100. Similarly, the distance value is computed for all of the remaining pixels in the two pixel blocks. Each of these distance values equals zero, therefore, since these distance values are less than the pixel threshold, they are not added to the distance sum.

Consequently, after the distance values for all pixels have been processed, the distance sum equals 195,075. Since this value is greater than the block threshold of 200, the block is designated. This example illustrates the advantages of the two-level thresholding feature of the NRDT sub-algorithm. That is, the noise that occurred in current pixel 756 of current pixel block 753 was ignored, whereas the real change in video that occurred in current pixel 1 754 of current pixel block 753 was recognized.

Figure 8:
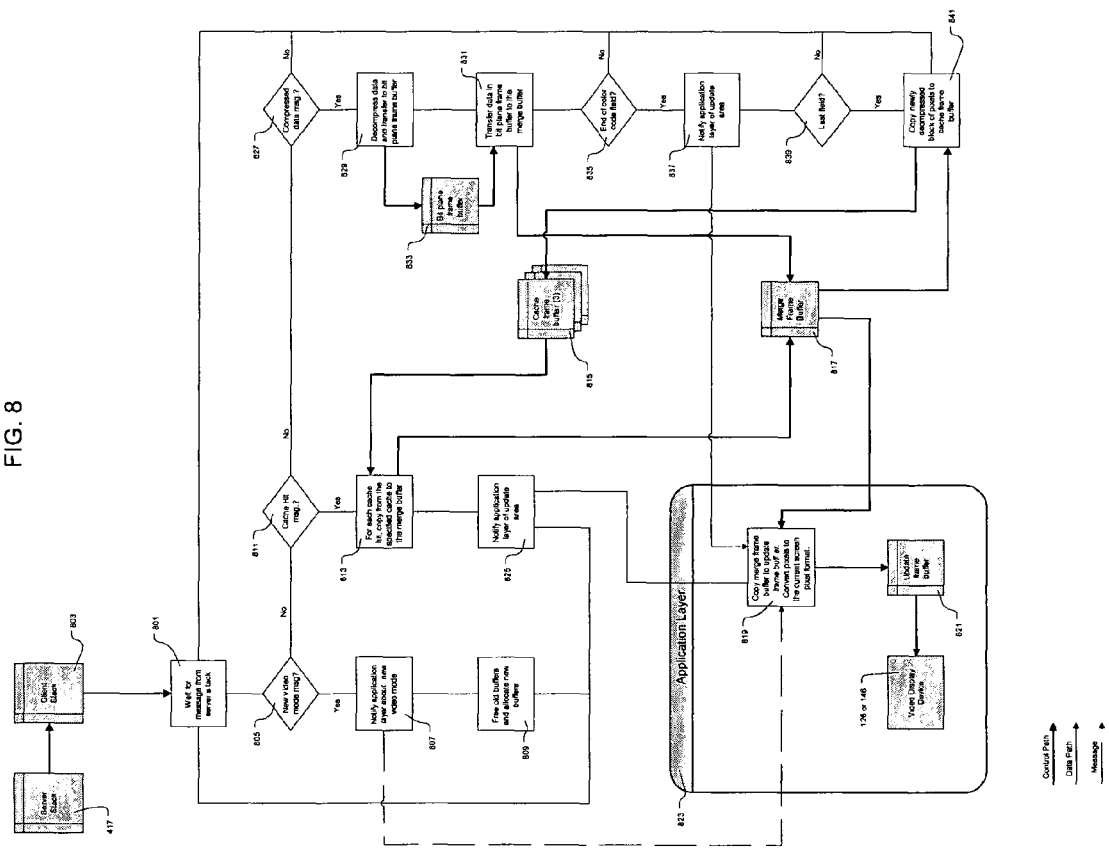
FIG. 8 depicts a detailed flowchart of the operation of the decompression algorithm according to the preferred embodiment of the present invention.

Turning finally to FIG. 8, shown is a flowchart of the decompression algorithm executed by remote participant equipment (e.g., video client 124 or remote computer 138 (FIG. 1)). The decompression algorithm begins by waiting for a message (step 801). This message is transmitted from server stack 417 of video server 102 via communication medium 114 or 116 to communication device 122 or 124, respectively (FIG. 1). Thereafter, microprocessor 333 or 303 receives the information from communication device 122 or 124 (FIGS. 3A and 3B), respectively, and writes the data to client stack 803. Client stack 803 may be a register in microprocessor 333 or 303, memory 331 or 307, or some other device capable of permanently or temporarily storing digital data. In one embodiment of the present invention, messages are transmitted using a TCP/IP communication protocol. In this scenario, client stack 303 is the local TCP/IP stack. Other embodiments may use a protocol other than TCP/IP. However, irrespective of the communication protocol, the present invention uses client stack 303 to store received messages for processing.

Once a message is received in client stack 303, it is processed to determine whether the message is a new video mode message (step 805). A new video mode message may be sent for a variety of reasons including a bandwidth change, a change in screen resolution or color depth, a new client, etc. This list is not intended to limit the reasons for sending a new video mode message, but instead to give examples of when it may occur. If the message is a new video mode message, application layer 823 is notified of the new video mode (step 807). According to the preferred embodiment, application layer 823 is software executed by microprocessor 303 or 333 that interfaces with the input and output devices of the remote participation equipment (e.g., video display device 126 or 146, etc.). Any video updates must therefore be sent to application layer 823. Also, the old buffers are freed, including all memory devoted to storing previously transmitted frames, and new buffers are allocated (step 809). The decompression algorithm then returns to step 801.

If the new message is not a video mode message, the message is further processed to determine if it is a cache hit message (step 811). If yes, the cache hit message is deciphered to determine which block of pixels, of the blocks of pixels stored in the three cache frame buffers 815, should be used to reconstruct the respective portion of the video image. Although three cache frame buffers 815 are used in the preferred embodiment of the present invention, any quantity of cache frame buffers may be used without departing from the spirit of the invention. Cache frame buffers 815 store the same blocks of pixels that are stored in the cache frame buffers located internal to video server 102 (FIG. 2). Thus, the cache hit message does not include video data, but rather it simply directs the remote participation equipment as to which block of pixels contained in the cache frame buffer 815 should be sent to merge frame buffer 817. The block of pixels contained within the specified cache is then copied from cache frame buffer 815 to merge buffer 817 (step 813). Finally, application layer 823 is notified that an area of the video image has been updated (step 825). Merge buffer 817 contains the current representation of the entire frame of video in color code pixels. Application layer 823 copies the pixel data from merge buffer 817 and formats the data to match the pixel format of the connected video display device 126 or 146 (step 819). Thereafter, the formatted pixel data is written to update frame buffer 821, which then transmits the data to video display device 126 or 146. Alternatively, in lieu of a video display device, the formatted pixel data may be written to a video card, memory, and/or any other hardware or software commonly used with video display devices.

Further, if the new message is not a new video mode or cache hit message, it is tested to determine if it is a message containing compressed video data (step 827). If the message does not contain compressed video data, the decompression algorithm returns to step 801 and waits for a new message to be transmitted from server stack 417. Otherwise, if the message does contain compressed video data, the data is decompressed and transferred to bit plane frame buffer 833 (step 829). As described above, the preferred embodiment incorporates the JBIG lossless compression technique. Therefore, decompression of the video data must be performed for each individual bit plane. After each bit plane is decompressed, it is merged with previously decompressed bit planes, which are stored in bit plane frame buffer 833 (step 829). When a sufficient number of bit planes have been merged, the merged data contained in bit plane frame buffer 833 is transferred to merge frame buffer 817 (step 831). Alternatively, individual bit planes may be decompressed and stored directly in merge frame buffer 817, thereby eliminating step 831. When all of the data required to display a full frame of video is transferred to merge frame buffer 817, application layer 823 copies the data in merge frame buffer 817 to update frame buffer 821 (step 819). Thereafter, the data is transferred to video display device 126 or 146.

In an alternate embodiment, the video displayed on video display device 126 or 146 can be updated after each bit plane is received. In other words, a user does not have to wait until the whole updated frame of video is received to update portions of the displayed video. This alternative method is desirable when the bandwidth available for video transmission varies. Also, this progressive method of updating the video display is one of the advantages of using the JBIG compression algorithm.

Next, the decompression algorithm determines whether all of the color code data from one field of the current video frame has been received (step 835). If a full field has not been received, the decompression algorithm returns to step 801 and waits for the remainder of the message, which is transmitted from server stack 417 to client stack 803 in the form of a new message. Otherwise, if a full field has been received, the decompression method notifies application layer 823 (step 837). Similar to that described above with respect to processing cache hit messages, this notification directs application layer 823 to read the data in merge frame buffer 817 and convert it to the current screen pixel format (step 819). Thereafter, the formatted data is written to update frame buffer 821, which transmits the data to video display device 126 or 146.

After a full field has been received and application layer 823 has been notified, a second determination is made to determine if the full field is the last field included in the message. If it is, the newly decompressed block of pixels is written to one of the cache frame buffers 815 (step 841). Otherwise, the decompression algorithm returns to step 801 and continues to wait for a new message. Preferably, the new block of pixels written to cache frame buffer 815 overwrites the oldest block of pixels contained therein. Step 841 ensures that the cache is up-to-date and synchronized with the cache of video server 102. After the completion of the cache update, the decompression algorithm returns to step 801.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

We claim:

1. A video conferencing system comprising:
   a video server having a specific internet address and a video input port for receiving a source video signal appearing on a video output port of an initiating computer, the video server transforming the source video signal into a video server output signal having a format suitable for communication over the Internet;
   a plurality of remote computers, each of the remote computers executing a respective browser application to access the video server via the specific Internet address associated with the video server; and the video server downloading the video server output signal to each of the remote computers upon its respective access to the video server, wherein access by the remote computer is verified by a first encryption technique that requires confirmation by the video server of authentication and security authorization information entered at the remote computer and wherein the video server output signals themselves are encrypted by a second encryption technique, wherein each of the remote computers decrypts via the second encryption technique and transforms the downloaded video server output signal into a display signal suitable for viewing on a display device associated with that remote computer, and wherein a representation of the source video signal at the initiating computer is viewable on each of the plurality of remote computers.

2. The video conferencing system of claim 1 wherein the source video signal is received from the initiating computer via a communications path that does not provide signal processing to the source video signal.

3. The video conferencing system of claim 1 wherein one of the plurality of remote computers has at least one associated input device selected from the group consisting of a keyboard and a mouse for entering input signals.

4. The video conferencing system of claim 3 wherein the input signals from the at least one input device are supplied in response to prompts displayed on the display device associated with that one remote computer.

5. The video conferencing system of claim 1 wherein downloading of the video server output signal by the video server is a type from the group consisting of multicasting and broadcasting.

6. The video conferencing system of claim 1 wherein the video server utilizes a compression algorithm in transforming the source video signal into the video server output signal.

7. The video conferencing system of claim 6 wherein the video server output signal is associated with an image and each of the remote computers execute a decompression algorithm that identifies changes to portions of the video image associated with the video server output signal received at different times.

8. The video conferencing system of claim 1 wherein the video server output signal is encrypted by the video server prior to downloading to each of the plurality of remote computers.

9. The video conferencing system of claim 1 wherein the video server downloads a software application to those of the plurality of remote computers that do not have this software application already resident thereon.

10. The video conferencing system of claim 1 wherein the video output port is one selected from the group consisting of VGA, SVGA, S-video, and composite video and the source video signal has a signal format corresponding to the selected video output port.

11. A method of video signal transmission comprising the steps of:
providing a source video signal at a video output port of an initiating computer to a video input port of a video server having a specific Internet address;
transforming the source video signal into a video server output signal having a form suitable for communication over the Internet;
authenticating a remote computers security authorization information entered at the remote computer via a first encryption technique;
encrypting the downloaded video server output signals via a second encryption technique,
downloading the video server output signal to each of the plurality of remote computers that access the video server directly via the specific Internet address and provide authenticated security authorization via the first encryption technique using respective browser applications executing on that remote computer,
decrypting the downloaded video server output signals via the second encryption technique
transforming the downloaded video server output signal into a display signal at each of the plurality of remote computers that is suitable for viewing a representative image of that on a display device associated with that remote computer wherein a representation of the source video signal at the initiating computer is viewable on each of the plurality of remote computers.

12. The method of claim 11 wherein the providing of source video signal to the video input port of the video server is done without any signal processing.

13. The method of claim 11 wherein the authentication of whether each remote computer is authorized to receive the video server output signal is done based on input signals from at least one input device associated with that remote computer.

14. The method of claim 13 wherein the input signals coupled from the at least one input device are supplied in response to prompts displayed on the display device associated with that remote computer.

15. The method of claim 11 wherein downloading of the video server output signal by the video server is a type from the group consisting of multicasting and broadcasting.

16. The method of claim 11 wherein the video server utilizes a compression algorithm in transforming the source video signal into the video server output signal.

17. The method of claim 12 wherein the downloaded video server output signal is encrypted.

18. A video signal transmission method comprising the steps of
receiving a source video signal on a video input terminal of a video server with its own specific Internet address, the source video signal being coupled to the video input terminal from a video output terminal of an initiating computer via a communications path;
transforming the source video signal into a video server output signal having a format suitable for communication over the Internet; and
downloading the video server output signal to each of a plurality of remote computers accessing the video server wherein access by the remote computer is verified by a first encryption technique that requires confirmation by the video server of authentication and security authorization information entered at the remote computer and wherein the video server output signals themselves are encrypted by a second encryption technique, and
wherein the plurality of remote computers executes a respective browser application for accessing the video server directly via use of the specific Internet address associated with the video server.

* * * * *